(12) United States Patent
Ofir

(10) Patent No.: US 12,510,698 B2
(45) Date of Patent: Dec. 30, 2025

(54) SLANTED BURIED DIFFRACTIVE GRATINGS FOR OPTICAL ELEMENTS OF AUGMENTED REALITY AND VIRTUAL REALITY DISPLAYS

(71) Applicant: Adeia Guides Inc., San Jose, CA (US)

(72) Inventor: Yuval Ofir, Kfar Ha-Oranim (IL)

(73) Assignee: Adeia Guides Inc., San Jose, CA (US)

( * ) Notice: Subject to any disclaimer, the term of this patent is extended or adjusted under 35 U.S.C. 154(b) by 548 days.

(21) Appl. No.: 17/979,923

(22) Filed: Nov. 3, 2022

(65) Prior Publication Data

US 2024/0151885 A1    May 9, 2024

(51) Int. Cl.
*G02B 5/18*    (2006.01)
*G02B 6/34*    (2006.01)
*G02B 27/01*   (2006.01)

(52) U.S. Cl.
CPC ............. *G02B 5/1866* (2013.01); *G02B 6/34* (2013.01); *G02B 27/0172* (2013.01)

(58) Field of Classification Search
CPC ... G02B 6/34; G02B 27/4272; G02B 27/0172
See application file for complete search history.

(56) References Cited

U.S. PATENT DOCUMENTS

| | | | |
|---|---|---|---|
| 12,124,069 B1* | 10/2024 | Chen | G02B 6/0026 |
| 2014/0232651 A1* | 8/2014 | Kress | G06F 3/013 |
| | | | 345/158 |
| 2017/0097507 A1* | 4/2017 | Yeoh | G06T 15/005 |
| 2018/0284460 A1* | 10/2018 | Cheng | G02B 27/0172 |
| 2018/0292599 A1* | 10/2018 | Ofir | G02B 6/0065 |
| 2020/0257120 A1* | 8/2020 | Genier | G02B 6/0016 |
| 2020/0271847 A1* | 8/2020 | Singer | G02B 27/0172 |

FOREIGN PATENT DOCUMENTS

WO     2005024969 A2    3/2005

* cited by examiner

*Primary Examiner* — Alexander P Gross
(74) *Attorney, Agent, or Firm* — HALEY GUILIANO LLP

(57) ABSTRACT

Head-mounted displays (HMD) or other suitable optical equipment with waveguides comprising one or more slanted buried diffractive gratings and methods for fabricating said waveguides are described herein. In an embodiment, an HMD comprises an optical element and an image source that provides an image beam to the optical element. The optical element may comprise a first flat surface, a second flat surface, and a buried diffractive grating disposed between the first surface and the second surface. The buried diffractive grating may be positioned in a slanted arrangement at a particular angle relative to the first flat surface and the second flat surface.

20 Claims, 15 Drawing Sheets

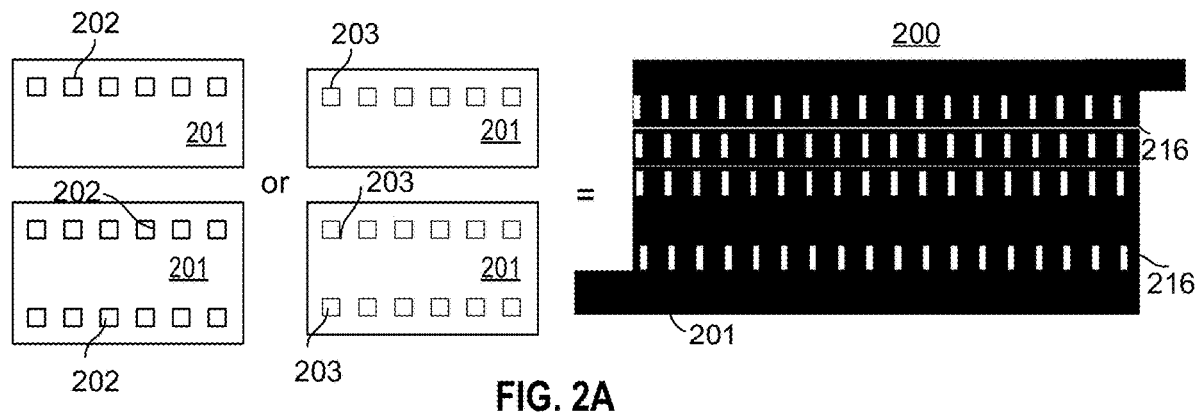
FIG. 2A
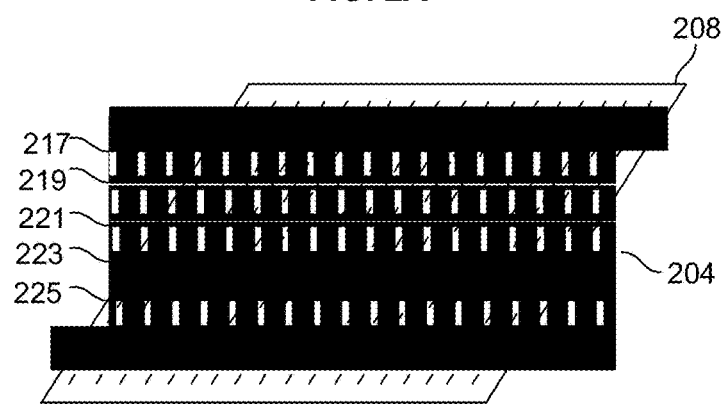
FIG. 2B
FIG. 2C
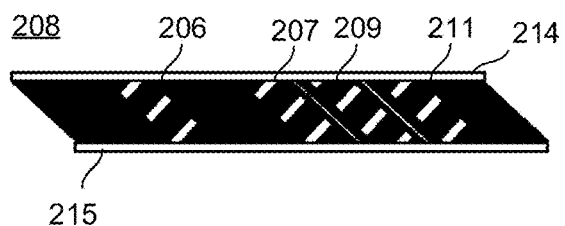

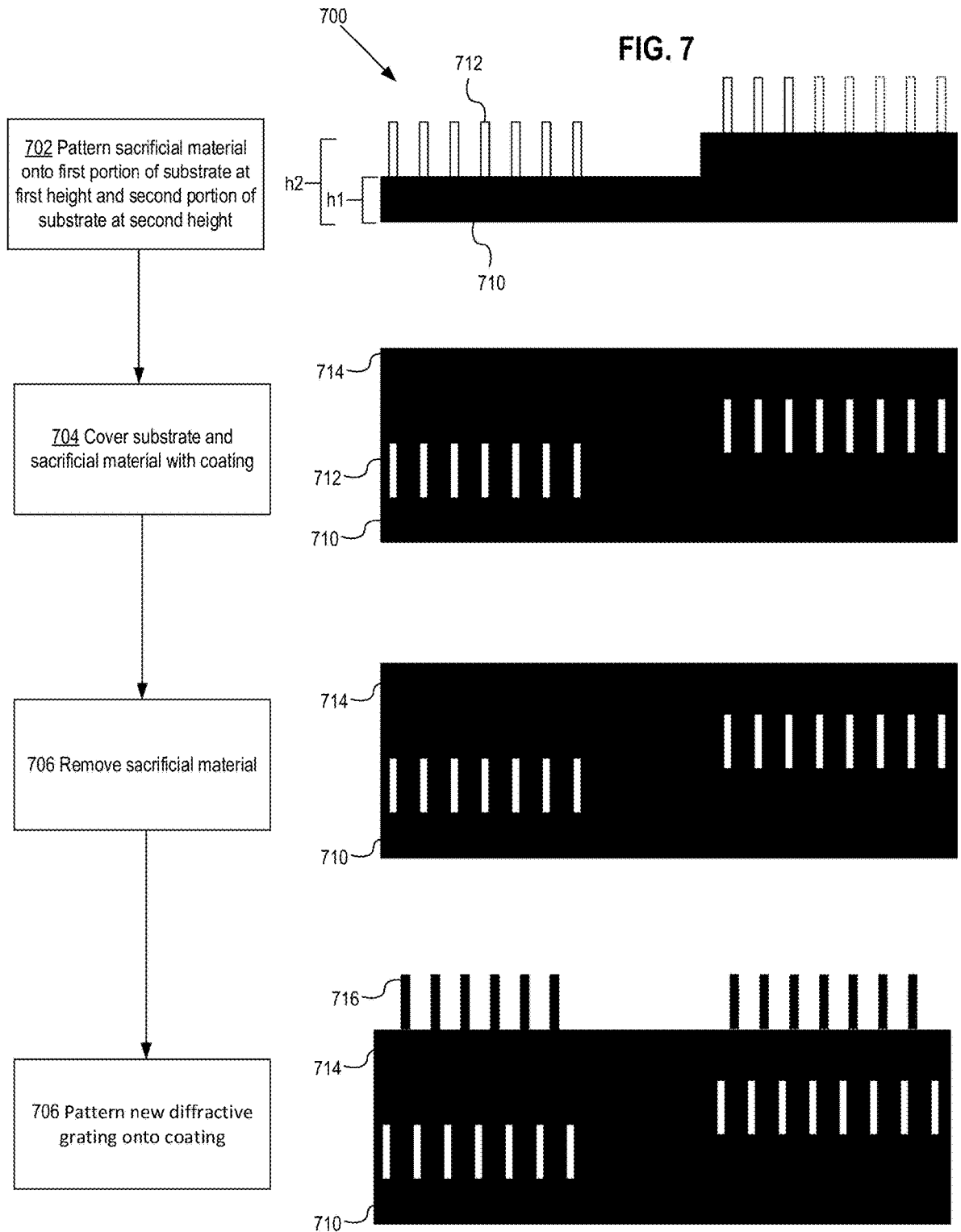

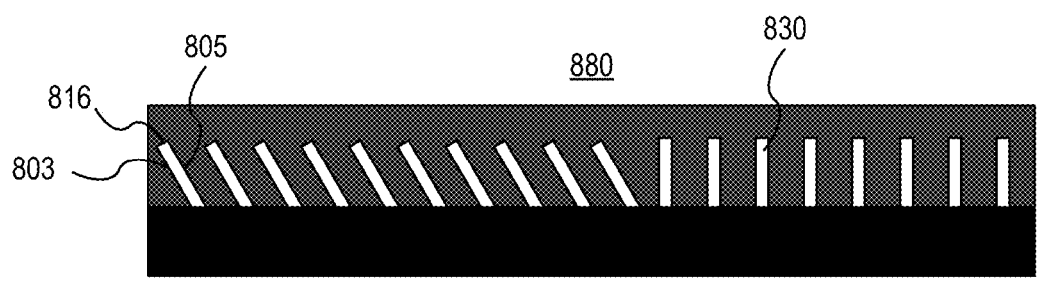
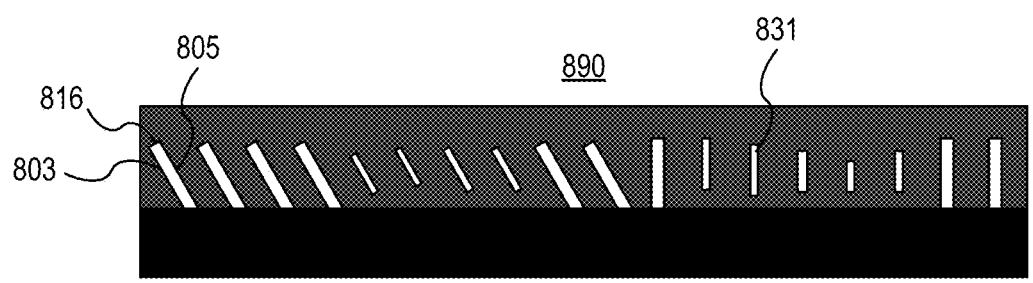
FIG. 8B

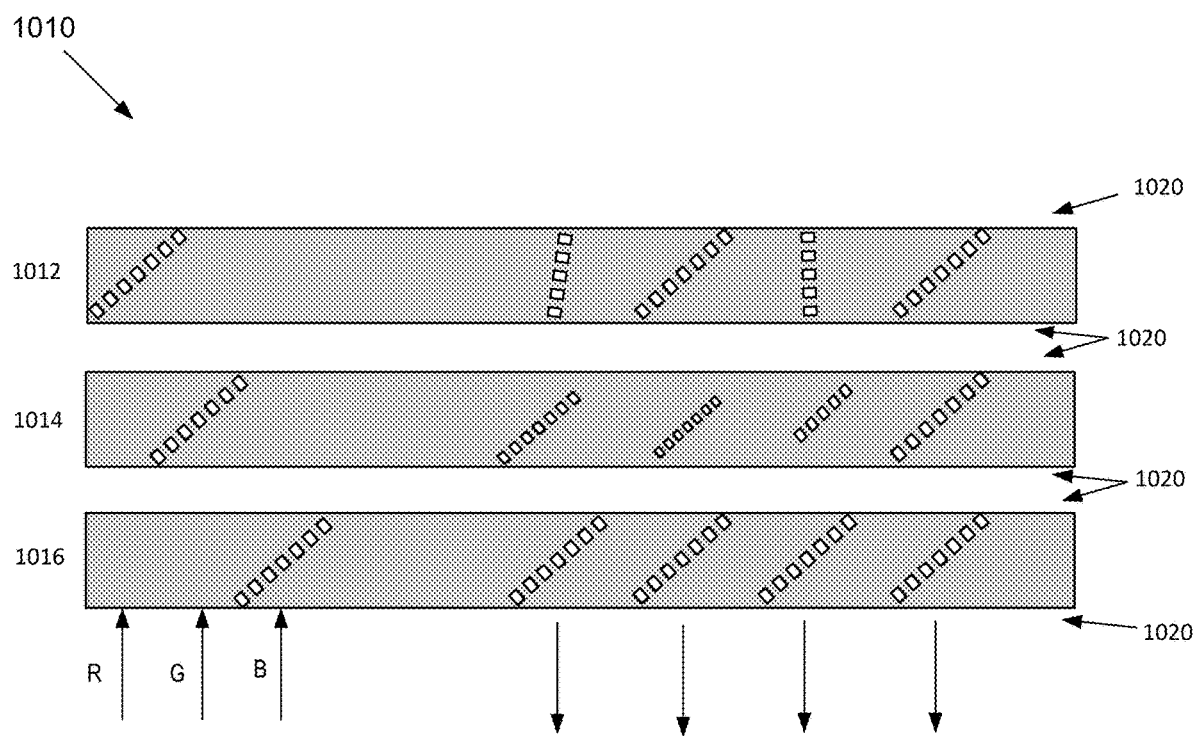
FIG. 10B

SLANTED BURIED DIFFRACTIVE GRATINGS FOR OPTICAL ELEMENTS OF AUGMENTED REALITY AND VIRTUAL REALITY DISPLAYS

BACKGROUND

This disclosure is generally directed to optical elements. In particular, the present disclosure relates to slanted buried diffractive gratings for use in optical equipment (e.g., for optical devices in augmented and virtual reality displays).

SUMMARY

Virtual reality (VR) and augmented reality (AR) systems are becoming increasingly common in the modern world. A large focus of modern optical and electrooptical technologies is to create head-mounted displays (HMDs) or near-eye displays (NEDs) that create virtual images in a field-of-view of one or both eyes of a user. While HMDs have become common for use with VR, they are less popular for AR implementations, where their relative current bulkiness creates difficulty for use in everyday environments.

One of the reasons for the bulkiness of HMDs is the optical elements used to create them. In some approaches, HMDs include waveguides made from glass or plastic, which diffract or reflect light from an image source to an eye of the user. The waveguides may be implemented in lenses of glasses that are attached to the image source. In the case of diffractive waveguides, waveguides include diffractive gratings, such as an input coupler (in-coupling) grating and an output coupler (out-coupling) grating. Example gratings used in such waveguides include volume Bragg gratings and surface relief gratings.

Volume Bragg gratings are useful in that they provide refractive index modulation, but they can be difficult to fabricate as they involve irradiating photosensitive glass with ultraviolet light. Conversely, surface relief gratings can be mass-produced with lithographic techniques as they involve creating surface structures that diffract incoming light beams.

The surface relief grating can use structures on the surface of the waveguide to diffract light based on differences in the refractive indices between the structures and the surrounding air. As the difference in refractive indices between the structures and the air increase, the angle by which the image beam is diffracted increases as well, thereby reducing the number of times the beam reflects through a waveguide of a given length before being diffracted out through the out-coupling grating and helping to increase the quality of the produced image. Thus, manufactures of waveguides often work to increase the difference between the refractive indices of the structures and the surrounding air by using materials for the structures that have a high refractive index.

However, materials with high refractive indices can be expensive, difficult to work with, rare, or difficult to manufacture. Additionally, even the best currently available materials for creating diffractive gratings can be improved with respect to the diffraction of the image beam. Additionally, optimizing the difference in refractive indices through use of high-refractive index materials limits the types of materials that can be used, thereby removing materials that could provide different benefits, such as transparent conductive materials, which can be used to absorb unpolarized or polarized light.

In addition, surface relief gratings may be limited in usability, as they can be extremely fragile, and might break or damage during handling and fabrication. These issues are compounded when combined with HMDs which are often built with multiple waveguides for different frequencies of light. Additionally, for AR usage, people with vision problems may require additional corrective lenses in addition to the waveguides. The addition of lenses or coatings to waveguides with surface relief gratings may not be a straightforward process. In one approach, there may be an attempt to control diffraction efficiency of a diffractive pattern by employing various designs such as blazed, binary, analogue structures, or stairs-based diffractive elements. However, such an approach is also constrained since the degree of tilting/varying depth and structure of the features of the grating may be very limited due to fabrication difficulties. In another approach, multiple waveguides are mounted in a housing and spaced such that the lenses do not touch each other. If other types of lenses are required, they can also be mounted in the housing such that they do not touch the surface of the waveguides. To further protect the waveguides, the housing may have an outer shell that fully surrounds all of the waveguides. However, while this approach protects the surface relief gratings, the resulting HMD is bulky and cumbersome.

To help overcome such deficiencies, optical equipment (e.g., HMDs, near-eye displays or other suitable optical equipment) with optical elements including one or more slanted buried diffractive gratings and methods for fabricating said waveguides are described herein. In some embodiments, the optical elements described herein correspond to a waveguide or comprise a waveguide. In some embodiments, a display, such as, for example, an HMD or other optical equipment, may comprise the optical element and an image source that provides an image beam to the optical element. The optical element may comprise a first flat surface, a second flat surface, and a buried diffractive grating disposed between the first and second surfaces. The buried diffractive grating may be positioned in a slanted arrangement at a particular angle relative to the first flat surface and the second flat surface. The optical element may be configured to convert the image beam into an output image by diffracting the beam through the buried diffractive grating, propagating the image beam through the optical element through reflection off the first and second surfaces, and direct the image beam through at least one of the first or second surfaces of the optical element.

In some embodiments, the buried diffractive grating comprises a first surface opposing a second surface, and the buried diffractive grating being positioned in the slanted arrangement at the particular angle relative to the first flat surface and the second flat surface of the optical element comprises the first surface and the second surface of the buried diffractive grating being positioned in the slanted arrangement at the particular angle relative to the first flat surface and the second flat surface.

The buried diffractive grating may be used as one or more of an in-coupling grating, an out-coupling grating, an expansion grating, or any other diffractive grating used in conjunction with a display, such as, for example, an HMD or other suitable optical equipment.

In some embodiments, such slanted arrangement of the buried diffractive grating may provide a number of advantages, such as, for example, facilitating a less complex fabrication process, and enabling higher diffraction efficiency without the further need to slant diffractive pattern features. In some embodiments, the slanted arrangement may enable more efficient diffraction of light at any given refractive index (rendering a dependency on high refractive index materials less problematic).

In some embodiments, various techniques may be employed to optimize the efficiency of a set of slanted buried diffractive gratings in the waveguide, e.g., along slanted buried diffractive gratings progressing further into the waveguide, which may be desirable due to less light being in the waveguide as portions of light may be diffracted and transmitted out along the waveguide. In some embodiments, the buried diffractive grating comprises a plurality of buried diffractive gratings, one or more of which having the slanted arrangement, the plurality of buried diffractive gratings including a first buried diffractive grating and a second buried diffractive grating. For example, the first buried diffractive grating (e.g., an in-coupling grating having the slanted arrangement) may be of a different size than the second buried diffractive grating (e.g., an out-coupling grating having the slanted arrangement), which can contribute to maintaining the optical quality of images output by the display.

In some embodiments, the first buried diffractive grating can be positioned at a first depth within the optical element and the second buried diffractive out-coupling grating can be positioned at a second depth, different from the first depth, within the optical element. In some embodiments, the first buried diffractive grating comprises a refractive index that is different from a refractive index of the second diffractive grating. In some embodiments, the first buried diffractive grating having the slanted arrangement can be slanted at the particular angle, and the second buried diffractive grating can be slanted at an angle that is different from the particular angle. In some embodiments, the first buried diffractive grating is spaced closer to the first surface than the second buried diffractive grating. In some embodiments, the first buried diffractive grating having the slanted arrangement can be slanted at the particular angle, and the second buried diffractive grating can have a non-slanted arrangement. The present disclosure contemplates optical elements that incorporate various combinations of these and other embodiments or aspects disclosed herein.

In some embodiments, a method of producing a buried diffractive grating in a waveguide comprises fabricating an optical element with a buried diffractive grating positioned in a slanted arrangement at a particular angle relative to a first flat surface and a second flat surface of the optical element. The buried diffractive grating may be disposed between the first flat surface and the second flat surface, and the first flat surface opposes the second flat surface. In some embodiments, the buried diffractive grating may be spaced from the first flat surface and the second flat surface. In some embodiments, fabricating the optical element comprises bonding together a plurality of layers to obtain a stack of the plurality of layers, wherein at least one of the layers comprises one or more diffractive gratings, and slicing the stack of the plurality of layers at a desired angle to obtain the optical element comprising the buried diffractive grating having the slanted arrangement.

In some embodiments, each of the plurality of layers of the stack comprises at least one diffractive grating. In some embodiments, at least one of the plurality of layers of the stack comprises diffractive gratings on a first surface and a second surface thereof. In some embodiments, at least one of the plurality of layers of the stack does not comprise a diffractive grating. In some embodiments, the one or more of diffractive gratings of the at least one of the layers comprise a surface relief diffractive grating or a buried diffractive grating. In some embodiments, the particular angle for each respective grating is based on of the desired angle at which the slicing is performed and properties of one or more materials used to fabricate the respective grating.

In some embodiments, a method of producing each of the plurality of layers of the stack comprises patterning a sacrificial material on a surface of a transparent material, such as glass or plastic. The sacrificial material is then coated with a coating comprising a refractive index that is substantially equal to the refractive index of the transparent material, such as cubic zirconium oxide, titanium oxide, aluminum oxide, diamond hafnium oxide, tantalum oxide, or zinc oxide. The sacrificial material is then removed through a process of sintering or dissolution to form non-solid pockets within the optical waveguide.

Another method of producing each of the plurality of layers of the stack comprises patterning a low-index material, such as lithium fluoride, calcium fluoride, magnesium fluoride, or any other low refractive index optical resin, on a surface of a transparent material, such as glass or plastic. The low-index material is then coated with a coating comprising a refractive index that is substantially equal to the refractive index of the transparent material, such as cubic zirconium oxide, titanium oxide, aluminum oxide, diamond hafnium oxide, tantalum oxide, or zinc oxide or a relevant high refractive index resin.

Another method of producing each of the plurality of layers of the stack comprises fabricating a grating onto a transparent material, such as through various lithographic techniques. A flat piece of transparent material of a desired thickness is then bonded to the top of the grating, such as through glass laser bonding. An additional processing step may include thinning the flat piece of glass to the desired thickness.

In some embodiments, one or more of a surface relief grating or the buried diffractive grating may be fabricated using a transparent conductive material. The transparent conductive material comprises a material designed to absorb certain polarization light while also comprising a refractive index high enough that it can be used to diffract light. Examples of transparent conduct materials include transparent conductive oxides, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or conductive polymers, such as poly(3,4-ethylenedioxythiphene) (PEDOT) or poly (3,4-ethylenedioxythiophene): poly(styrene sulfonate) (PEDOT:PSS). In some embodiments, the transparent conductive material is used to create an in-coupling grating to reduce incoming stray light from the image source by absorbing unwanted polarizations. In some embodiments, the transparent conductive material is used to create an out-coupling grating to reduce stray light from external sources and/or to reduce the stray light diffracted to an eye of the user through the out-coupling grating, by absorbing unwanted polarizations. Other embodiments may use diffractive gratings such as any of the diffractive gratings of the waveguide and/or multiple diffractive gratings of the waveguide.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIGS. 2A-2C depict an example of fabricating an optical element of an HMD, or other suitable optical equipment, wherein the optical element may comprise or correspond to a waveguide with one or more slanted buried diffractive gratings;

FIG. 7 depicts an example of fabricating diffractive gratings at multiple depths in an optical element;

FIGS. 8A-8B depict example structures of slanted buried diffractive gratings;

FIGS. 10A-10B depict examples of a plurality of waveguides for use in an HMD or other suitable optical equipment;

DETAILED DESCRIPTION

Figure 1:
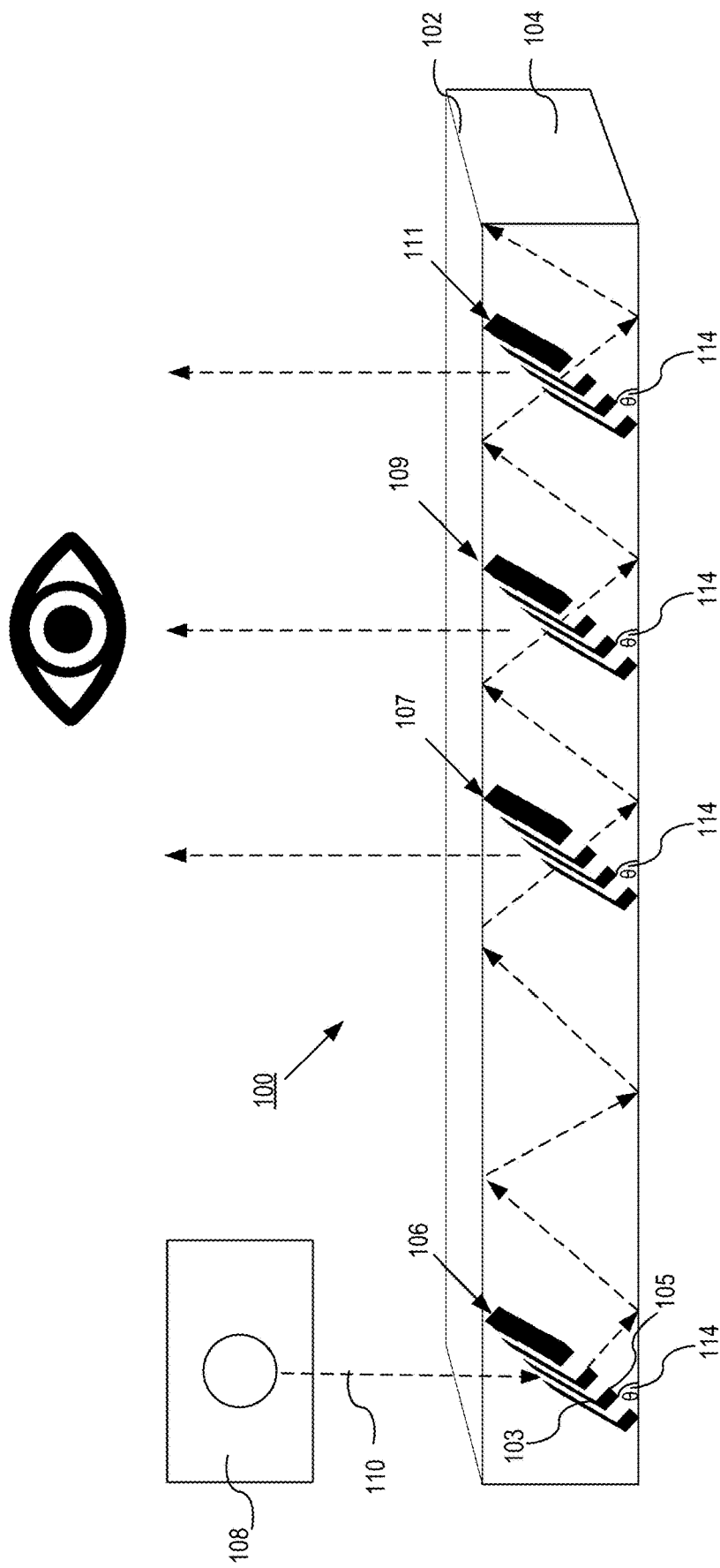
FIG. 1 depicts a diagram of an optical element of an HMD, or other suitable optical equipment, wherein the optical element may comprise or correspond to a waveguide with one or more slanted buried diffractive gratings.

FIG. 1 depicts a diagram of an optical element of a head-mounted display (HMD) or other optical equipment. In some embodiments, the optical element may comprise or correspond to a waveguide with one or more slanted buried diffractive gratings. Optical element 100 comprises a first flat surface 102 that is substantially parallel to an opposing second flat surface 104. The first flat surface 102 and second flat surface 104 may comprise a same material, such as glass or plastic, or different materials with substantially equal refractive indices. As used herein, a first refractive index is substantially equal to a second refractive index if the refractive indices differ by less than about 0.01. In some embodiments, the substantially equal refractive indices differ by less than about 0.001. In some embodiments, the substantially equal refractive indices differ by less than about 0.0001. In some embodiments, the first material at first flat surface 102 is a glass or plastic, and the second material at second flat surface 104 is a coating that has a refractive index that is substantially equal to the refractive index of the first material.

Optical element 100 comprises a buried diffractive grating 106 disposed between the first surface 102 and the second surface 104. The buried diffractive grating 106 may further be spaced from first surface 102 and/or second surface 104. The optical element 100 of FIG. 1 further includes buried diffractive gratings 107, 109 and 111 similar to grating 106, and which are disposed between first surface 102 and second surface 104. In some embodiments, buried diffractive grating 106 may be configured as an in-coupling grating, and buried diffractive gratings 107, 109 and 111 may be configured as out-coupling gratings. As shown in FIG. 1, each of slanted buried diffractive gratings 106, 107, 109 and 111 may be positioned in a slanted arrangement at a particular angle 114 with respect to first surface 102 and second surface 104. Each of slanted buried diffractive gratings 106, 107, 109 and 111 may comprise a plurality of features and/or structures, which may define, at least in part, a first surface 103 and a second surface 105 of each diffractive grating. First surface 103 may oppose second surface 105. In some embodiments, first surface 103 and second surface 105 of diffractive gratings 106, 107, 109 and 111 may be configured to be at a non-zero angle 114 with respect to surface 102 and the second surface 104 of optical element 100. In some embodiments, first surface 103 and second surface 105 of diffractive gratings 106, 107, 109 and 111 are oriented to be non-parallel with respect to first surface 102 and the second surface 104 of optical element 100. In some embodiments, angle 114 may be 45°, or any other suitable non-zero angle relative to first surface 102 and the second surface 104 of optical element 100. In some embodiments, angle 114 may vary based on one or more design choices, e.g., a field of view associated with the optical equipment, waveguide design (e.g., 1D/2D expansion), base material, or any other suitable feature or any combination thereof. In some embodiments, the respective angles of the first and second surfaces of diffractive gratings 106, 107, 109 and 111 relative to first surface 102 and the second surface 104 of optical element 100 may each be the same or may vary with respect to each other. In some embodiments, angle 114 may be greater than zero or less than zero relative to first surface 102 and the second surface 104 of optical element 100.

Methods for creating a slanted buried diffractive grating (e.g., 106, 107, 109 and/or 111 and/or any other suitable number of gratings at any suitable position within one or more optical elements 100) are described further herein. Any suitable number of slanted buried diffractive gratings (optionally in combination with other types of buried or surface or other diffractive gratings) may be distributed along the waveguide.

The set of buried diffraction gratings 106, 107, 109 and 111 may be distributed into sections of the waveguide and buried inside the waveguides in a slanted arrangement. Image beam 110 may be projected from image source 108 in a first direction, and when image beam 110 reaches slanted buried diffractive grating 106, image beam 110 may be diffracted at a particular angle from the first direction. Image beam 110 travels through the waveguide through total internal reflection and is reflected towards buried diffractive grating 107 at a second direction. When image beam 110 reaches slanted buried diffractive grating 107, the image beam 110 is diffracted at a particular angle from the second direction. Image beam 110 may further travel through the waveguide and be diffracted at particular angles by way of slanted buried diffractive gratings 109 and 111. In some embodiments, at least a portion of light may be transmitted out of optical element 100 towards an eye of a user, e.g., at diffraction gratings 107, 109 and/or 111, while being reflected and diffracted through optical element 100. In some embodiments, the degree of diffraction efficiency can be further controlled along the slanted buried diffraction grating, and/or when moving between the different slanted surfaces progressing further into the waveguide.

While FIG. 1 depicts both the in-coupling grating and out-coupling grating as buried diffractive gratings, embodiments may include an optical element that comprises a buried diffractive grating as an in-coupling grating, out-coupling grating, expansion grating, or any combination thereof, and any suitable number of buried diffractive gratings may be employed.

The buried diffractive gratings may each comprise diffractive pattern features, such as, for example, a plurality of pockets of low refractive index material (e.g., shaded sections of 106, 107, 109 and 111) interspaced with high refractive index material (e.g., non-shaded sections of 106, 107, 109 and 111). The low refractive index material may include solid materials with relatively low refractive indices, such as lithium fluoride, calcium fluoride, magnesium fluoride, or optical resins, or nonsolid pockets, such as pockets of air, vacuum, or gas. The high refractive index material comprises a material that has a refractive index substantially equal to the refractive index of the material of the first surface and/or the second surface. In some embodiments, the high refractive index material is a same material as the first surface and/or second surface, such as glass or plastic. In other embodiments, the high refractive index material is a material different from one or more of the surfaces, such as a coating material. The coating material may comprise any of cubic zirconium oxide, titanium oxide, aluminum oxide, diamond, hafnium oxide, tantalum oxide, zinc oxide, or other high-index resins.

In some embodiments, the high refractive index material of the buried diffractive grating comprises a transparent conductive material. The transparent conductive material may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or a conductive polymer, such as poly(3,4-ethylenedioxythiphene) (PEDOT) or poly(3,4-ethylenedioxythiophene): poly(styrene sulfonate) (PEDOT:PSS).

FIG. 1 depicts the buried diffractive grating as a uniform slanted structure of the pockets with even spacing between adjacent pockets by the high refractive index material, which is illustrated as such for the purpose of providing a clear example. FIGS. 1-12 are provided as representations of the methods and systems described herein. The elements of FIGS. 1-12 are not intended to provide to-scale examples of the methods and systems described herein and embodiments may include different orientations of elements, different sizing of elements, different spacing of elements, or other different configurations of elements. The methods described herein may be used to generate buried diffractive gratings in a variety of different shapes and structures, including blazed structures, slanted structures, binary structures, analogue structures, varying-depth structures, or a combination thereof. Additionally, the diffractive gratings may utilize different types of spacings, such that the low refractive index material and high refractive index material sections have different widths.

Image source 108, which provides an image beam to the optical element 100, may comprise a device configured to project image beam 110 comprising beams of light corresponding to a plurality of pixels or voxels that are to be displayed as an image. In the example of FIG. 1, the image beam 110 is diffracted by in-coupling grating 106. A portion of the image beam may be transmitted out of the waveguide through a surface of the waveguide towards an eye of a user, and another portion of the diffracted image beam may be guided through the waveguide through total internal reflection across the first flat surface 102 and the second flat surface 104. The image beam is then diffracted by one or more out-coupling gratings (such as, for example, out-coupling buried diffractive gratings 107, 109 and/or 111) to be displayed to an eye of a user. In this manner, the optical element propagates the image beam through the waveguide and directs the image beam through a surface of the waveguide towards an eye of a user, thereby converting the image beam into an image for viewing by the user.

In some embodiments, optical element 100 may correspond to or be included in an optical device comprising a light-transmitting substrate (e.g., substrate 201 of FIG. 2A) having at least two major surfaces (e.g., first flat surface 102 and the second flat surface 104) parallel to each other and having edges. Optical means (e.g., buried diffraction gratings 106, 107, 109 and 111 and/or any other suitable components) may be configured to couple light waves located in a field-of view of a user and/or of the optical device into such substrate by internal reflection. In some embodiments, at least one partially diffractive surface located in such substrate may be non-parallel to the major surfaces of the substrate, and at least one of such major surfaces may be patterned with a diffractive structure.

FIGS. 2A-2C depict an example of fabricating an optical element of an HMD, or other suitable optical equipment, wherein the optical element may comprise or correspond to a waveguide with one or more slanted buried diffractive gratings. Structure 200 may comprise substrate 201, which may comprise a material with a high refractive index for fabricating diffractive gratings onto, such as glass or plastic. Diffractive gratings 202 and/or diffractive gratings 203 may be fabricated onto substrate 201 by, for example, using the techniques discussed in connection with FIGS. 4-7, as discussed in more detail below, and may correspond to, for example, surface relief diffractive gratings or buried diffractive gratings, or any other suitable diffractive grating, or any combination thereof. In some embodiments, as shown in the left-hand portion of FIG. 2A depicting a top plan view of structure 200, diffractive gratings 202 and/or diffractive gratings 203 may be fabricated on a single side, or on two sides, of substrate 201 and/or may be buried diffractive gratings disposed between surfaces of substrate 201. Diffractive gratings 202 may comprise a high-refractive index material interspersed with a low-refractive index material or non-solid pockets, such as, for example, gas, air or vacuum, and diffractive gratings 203 may comprise a material with a refractive index that is substantially lower than the refractive index of substrate 201. The right-hand portion of FIG. 2A shows a side view of structure 200 comprising diffractive gratings 216 patterned on substrate 201.

As shown in FIG. 2B, structure 200 may comprise a plurality of layers 217, 219, 221, 223 and 225 which may be bonded together into a stack 204, e.g., via an adhesive or glue or bonded together using any other suitable technique or any combination thereof. In some embodiments, each of the layers 217, 219, 221, 223 and 225 may correspond to diffractive plates, e.g., transparent plates such as, for example, glass plates. FIG. 2B depicts a side view of stack 204. While FIG. 2B depicts a stack of five layers, other embodiments may include more or less layers in stack 204. The diffractive gratings included in in stack 204 may be of the same configuration or different configurations. For example, in stack 204, each particular layer may have a diffractive grating at one surface of its substrate. As another example, if stack 204 contains six layer, diffractive gratings may be patterned on both sides of respective substrates of every other layer (e.g., first layer 217, third layer 221 and fifth layer 225 in stack 204) while one or more other layers in stack 204 (e.g., layer 223) may not contain diffractive gratings. In such example, only three of the six layers may be processed to form diffractive gratings, which may allow for alignment between surfaces of the layer (e.g., each layer, when stacked, may contain diffractive gratings) while minimizing the impact of deformation or stress which may be caused by the stacking process, on such alignment. It may be desirable when forming stack 204 to align the location and/or type of diffractive gratings in adjacent layer or in a particular layer of stack 204, to enhance the performance of the resultant slanted buried diffractive gratings formed by the slicing operation.

As shown in FIG. 2B, stack 204 may be diagonally sliced, e.g., at a desired angle, to form optical element 208 which may comprise or correspond to a waveguide including one or more slanted buried diffractive gratings (e.g., 206, 207, 209, and 211 as shown at FIG. 2C, showing a side view of the waveguide included in or corresponding to optical element 208) at a particular angle. In some embodiments, the particular angle of each respective slanted buried diffractive grating of optical element 208 may correspond to the angle (e.g., the desired angle) at which stack 204 is sliced. In some embodiments, the particular angle of each respective slanted buried diffractive grating of optical element 208 may be based on a combination of the angle (e.g., the desired angle) at which stack 204 is sliced, and/or internal features or properties of one or more materials used to fabricate the respective diffractive grating, and/or slanting of one or more diffractive pattern features. In such an instance, the particular angle of each respective slanted buried diffractive grating of optical element 208 may differ from the angle (e.g., the desired angle) at which stack 204 is sliced In some embodiments, optical element 208 may comprise at least one buried diffractive grating in a non-slanted arrangement. For example, such at least one buried diffractive grating may be fabricated, e.g., using any of the techniques of FIGS. 4-7, at a particular orientation such that after slicing is performed to form optical element 208, the at least one buried diffractive grating is oriented perpendicular to the substrate surfaces.

In some embodiments, a portion of each of the layers included in stack 204 may be included in the newly formed optical element 208. As shown in FIG. 2B and FIG. 2C, each of the slanted buried diffractive gratings resulting from the slicing operation may be buried inside optical element 208. For example, optical element 100 of FIG. 1 may correspond to, and may be formed in the same manner as, optical element 208 of FIG. 2. In some embodiments, optical element 208 may comprise slanted buried diffractive gratings are various locations in the waveguide.

As shown in FIG. 2C after the slicing operation, polishing and/or lapping may be performed on optical element 208 using any suitable technique to obtain a desired thickness of optical element 208, thickness, and/or backfilling with additional adhesive may be performed to optical element 208 and/or any other number of suitable steps may be performed. In some embodiments, further optimization of a waveguide comprising optical element 208 may be achieved by controlling the number of slanted surfaces and/or angles of the slanted surfaces for a particular layer or layers of stack 204. In some embodiments, one or more of capping plates, layers or elements 214 or 215 may be added on each side of the newly polished optical element 208, to allow for improved distribution of light in the waveguide. For example, one or more of capping elements 214 or 215 may be made of glass, and may be configured to permit light to propagate around, e.g., diffractive grating 209.

Figure 3:
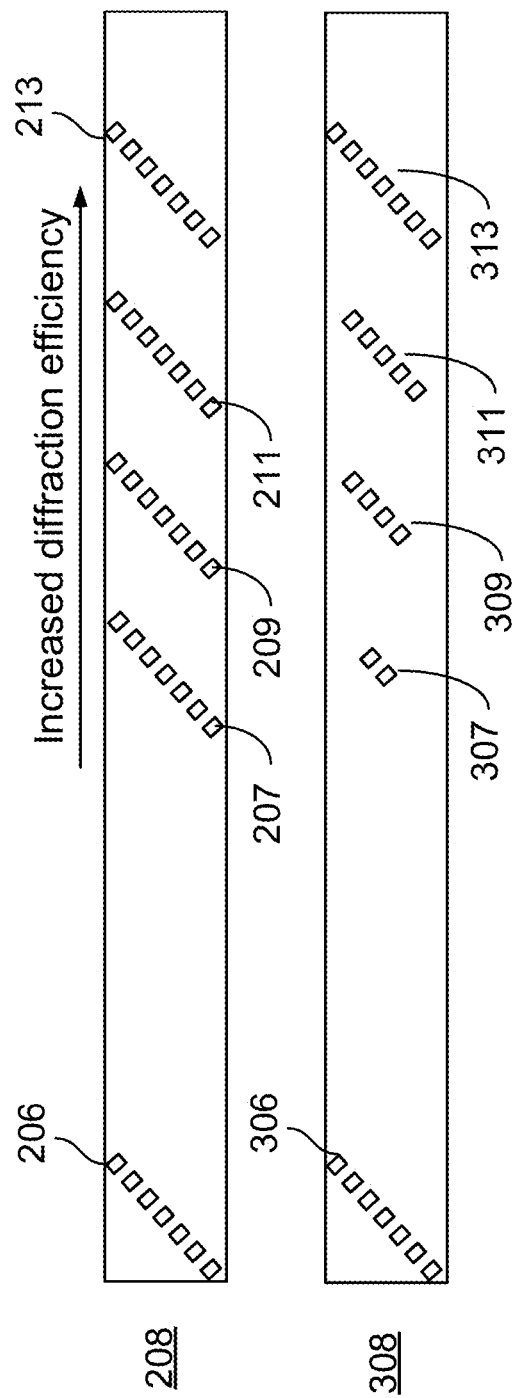
FIG. 3 depicts an example of optimizing a waveguide comprising one or more slanted buried diffractive gratings.

FIG. 3 depicts an example of optimizing a waveguide comprising one or more slanted buried diffractive gratings. In some embodiments, an arrangement of, or properties of, or other characteristics of, one or more of slanted buried diffractive gratings 206, 207, 209, and 211 of optical element 208 may be optimized to increase a diffraction efficiency along the waveguide. For example, since at least a portion of light may be transmitted out of the waveguide as the light propagates through the waveguide, it may be desirable that gratings further along the waveguide (e.g., an expansion grating or an out-coupling grating) be configured to have enhanced efficiency as compared to diffractive gratings (e.g., an in-coupling grating) positioned closer to where light (e.g., image beam 110) enters the waveguide.

In some embodiments, waveguide operation can be optimized by changing the size and/or position of certain slanted buried diffractive gratings in optical element 208. For example, as compared to the top portion of FIG. 3 depicting diffractive gratings 206, 207, 209, and 211, in the bottom portion of FIG. 3 a position and/or size and/or any other suitable characteristic of diffractive gratings 306, 307, 309, 311 and/or 313 may be modified. In some embodiments, waveguide operation can be optimized by changing the type of diffractive grating or pattern of each slanted surfaces. In some embodiments, varying the size of the diffractive area can contribute to improved image quality by allowing reduction of the overlapping of diffractive surfaces that can occur at larger angles. For example, increasing the diffraction efficiency along the waveguide may enable maintaining the brightness and optical quality of the image output by the display.

In some embodiments, a depth (e.g., with respect to a center position of optical element 208 or a starting depth of a diffractive grating) of one or more of the gratings within the waveguide may be modified. As another example, a refractive index of one or more of the gratings may be configured to be different, e.g., one or more waveguides towards the right-hand side of FIG. 3 may be configured to have a higher refractive index than or more waveguides towards the left-hand side of FIG. 3. As another example, an angle of one or more of the gratings may be configured to be different, e.g., gratings towards the right-hand side of FIG. 3 may be configured to be oriented at a larger angle as compared to gratings towards the left-hand side of FIG. 3. For example, this may be performed by modifying the internal properties of materials used to fabricate a particular diffractive grating. As yet another example, a size of the grating, such as, for example, a width or length of the grating, may be selectively configured based on the location of the grating within the waveguide. In some embodiments, a location at which each grating is positioned in the waveguide may be selectively chosen to optimize diffraction efficiency as light propagates from slanted buried grating 207 to slanted buried grating 211. Any suitable combination of these properties or characteristics, and/or any other suitable properties or characteristics, may be selectively chosen to optimize the efficiency of the waveguide having the slanted buried diffractive gratings. In some embodiments, for each respective slanted buried diffractive grating 206, 207, 209, and 211, a diffraction efficiency may be configured to be the same or greater than the prior grating. For example, a diffraction efficiency of grating 307 may be configured to be the same or greater than a diffraction efficiency of grating 306; a diffraction efficiency of grating 309 may be configured to be the same or greater than a diffraction efficiency of grating 307; a diffraction efficiency of grating 311 may be configured to be the same or greater than a diffraction efficiency of grating 309; and a diffraction efficiency of grating 313 may be configured to be the same or greater than a diffraction efficiency of grating 311.

FIGS. 4-7 depict different methods of creating diffractive gratings for use in optical elements for HMDs. The diffractive gratings of FIG. 2A may be generated using any of the methods described in FIGS. 4-7.

Figure 4:
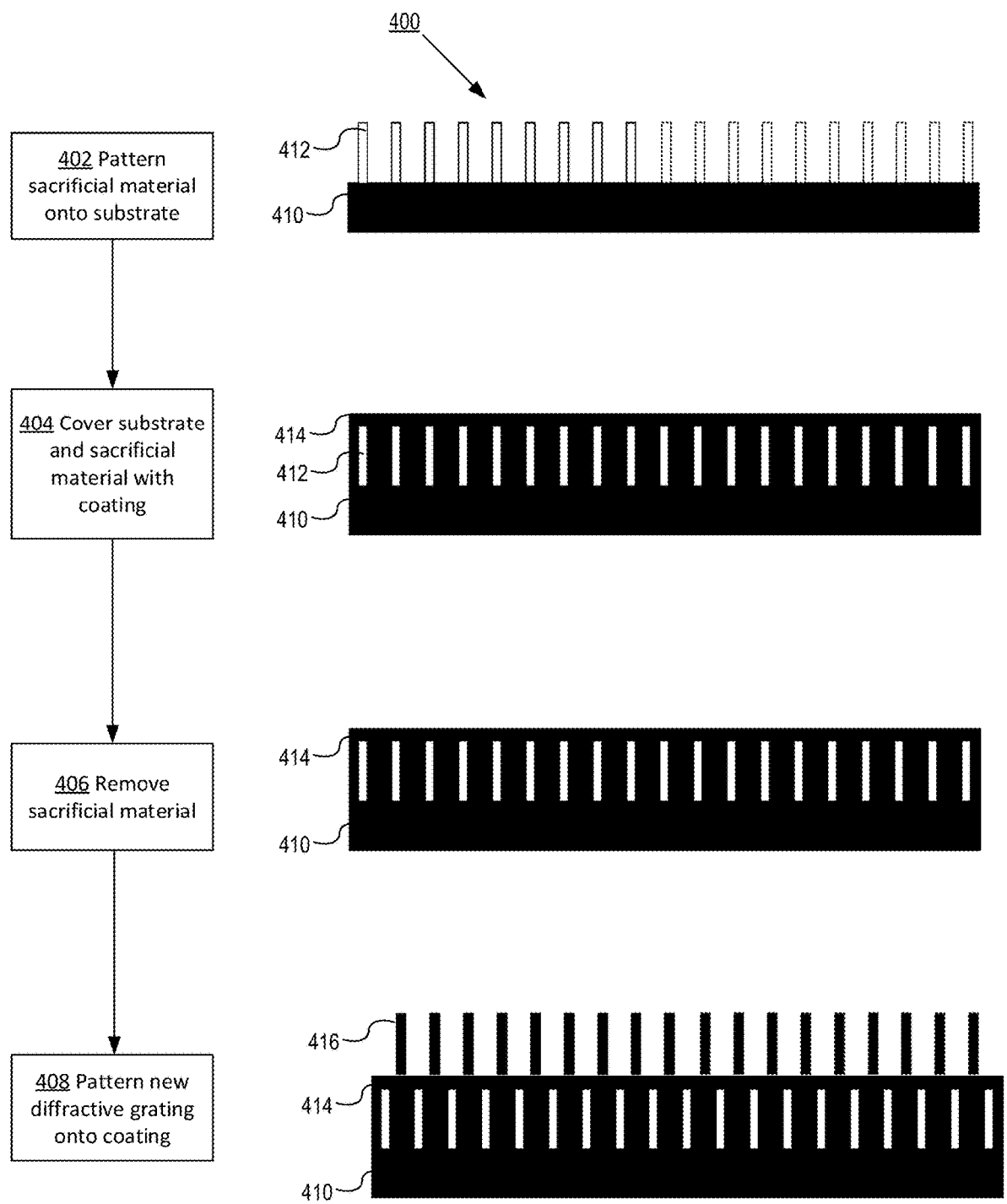
FIG. 4 depicts an example of fabricating diffractive gratings in an optical element using sacrificial material.

FIG. 4 depicts an example of fabricating diffractive gratings in an optical element using sacrificial material. Optical element 400 includes substrate 410. Substrate 410 may comprise a material with a high refractive index for fabricating the buried diffractive grating onto, such as glass or plastic. At step 402, sacrificial material 412 is patterned onto the substrate. Sacrificial material 412 may comprise a soluble or dissolvable material, such as a photoresist; a water-soluble polymer or material; or an organic-solvent soluble polymer or material. One example of sacrificial material includes water soluble polyvinyl alcohol.

The sacrificial material 412 may be patterned onto substrate 410 in any of a plurality of designs, including blazed patterns, slanted patterns, binary patterns, analogue structures, or varying-depth structures. Techniques for patterning sacrificial material 412 onto substrate 410 include any of electron beam lithography, interference lithography, nanoimprint lithography, hot embossing, photolithography, focused ion beams, or any other lithography or patterning techniques.

At step 404, a high-index coating 414 is applied to cover sacrificial material 412 and substrate 410. High-index coating 414 may comprise any of cubic zirconium oxide, titanium oxide, aluminum oxide, diamond, hafnium oxide, tantalum oxide, zinc oxide, or any other high-index resins. In some embodiments, high index coating 414 is selected to have a refractive index that is substantially equal to the refractive index of substrate 410. Processes for coating the high-index coating onto the sacrificial material 412 and substrate 410 include any of physical vapor deposition, atomic layer deposition, chemical vapor deposition, application of nanoparticle inks, spin coating, or dip-coating.

At step 406, after the high index coating has been applied to cover sacrificial material 412 and substrate 410, the sacrificial material is removed. For example, a sintering or dissolution process may be applied to optical element 400 to remove the sacrificial material.

At step 408, a new diffractive grating 416 may be patterned on top of coating 414. The new diffractive grating 416 may be patterned onto coating 414 in any of a plurality of designs, including blazed patterns, slanted patterns, or binary patterns, analogue structures, or any other suitable design, or any combination thereof. The design of new diffractive grating 416 may be a same design as the design of the sacrificial material 412 or a different design. Techniques for patterning new diffractive grating 416 onto coating 414 include any of electron beam lithography, interference lithography, nanoimprint lithography, hot embossing, photolithography, focused ion beams, or any other lithography or patterning techniques. In some embodiments, the new diffractive grating 416 is fabricated using a transparent conductive material.

While FIG. 4 depicts the fabrication of multiple types of diffraction gratings (e.g., a buried diffractive grating and a surface relief grating) in an optical element, in some embodiments, only one type of diffraction grating (e.g., the buried diffractive grating or the surface relief grating) may be fabricated in the optical element. In some embodiments, diffractive grating 416 may be patterned on multiple sides of substrate 410.

While FIG. 4 depicts the sacrificial material being separately patterned on, other embodiments may include different processes for creating patterns of sacrificial materials on substrate 410. For example, the sacrificial material may be applied to cover optical element 400 in a single layer. A stamp may then be pressed onto the sacrificial material to create the pattern depicted in FIG. 4. While the stamp is in place, ultraviolet nanoimprint lithography or thermal nanoimprint lithography may be used to harden the sacrificial material into place. The stamp may then be removed, thereby leaving a structure with a pattern of sacrificial material similar to the structure made through patterning of sacrificial material. Steps 404 and 406 may then proceed in the same way as described with respect to FIG. 4.

Figure 5:
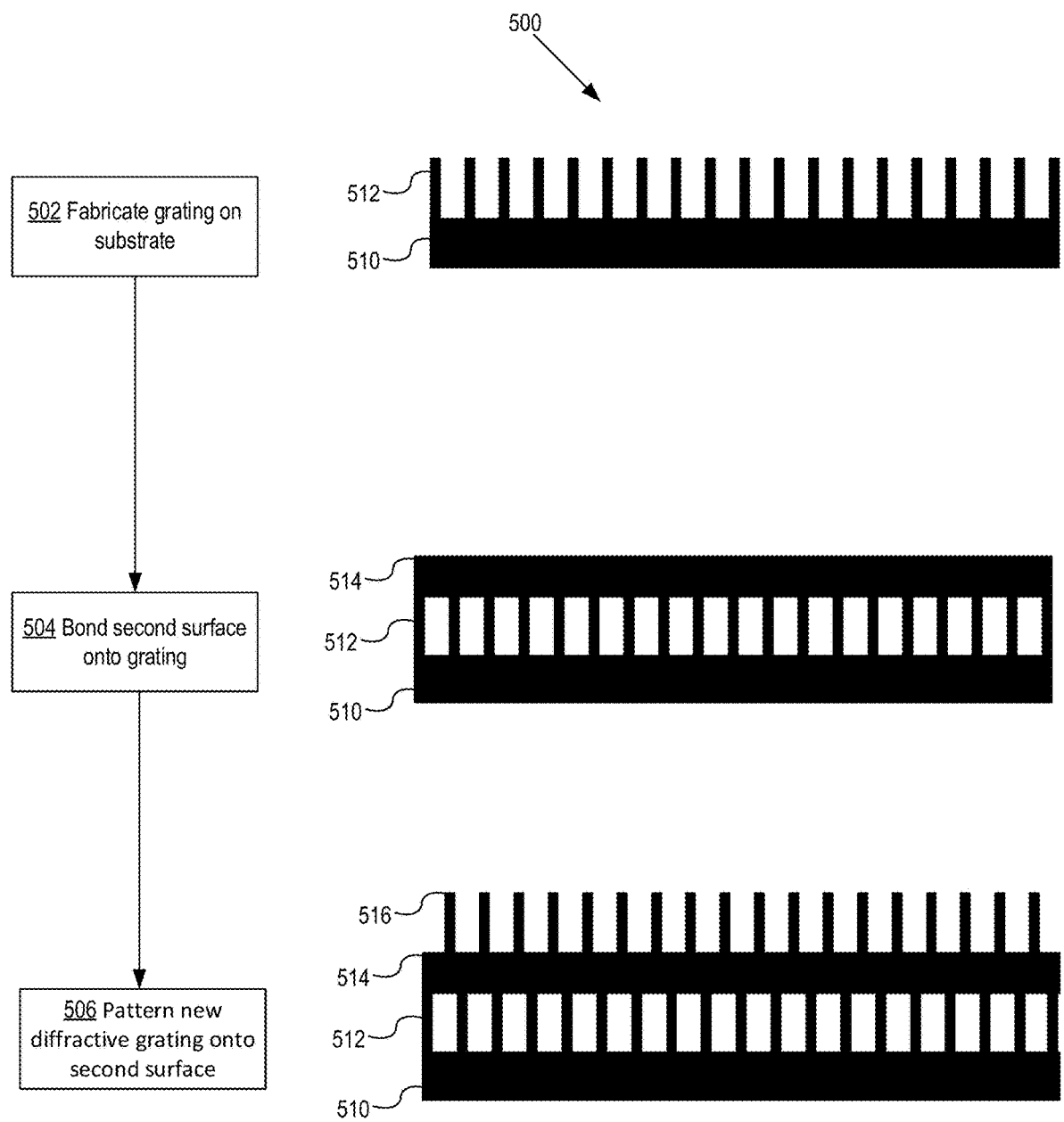
FIG. 5 depicts an example of fabricating diffractive gratings in an optical element using laser bonding.

FIG. 5 depicts an example of fabricating diffractive gratings in an optical element using laser bonding. Optical element 500 includes substrate 510. Substrate 510 may comprise a material with a high refractive index for fabricating the buried diffractive grating onto, such as glass or plastic. At step 502, grating 512 is fabricated onto substrate 510. For example, a standard surface relief grating may be fabricated onto the surface of substrate 310, such as through laser etching/ablation.

At step 504, a second surface 514 is bonded onto the grating to generate a buried diffractive grating via laser direct bonding in an adhesive-free process. The second surface 314 may comprise a material with a substantially equal refractive index as the first material. In some embodiments, the second surface 314 is a same material as substrate 310. For example, both materials may be glass with a same refractive index. The second surface may be attached to the first surface and grating through any bonding techniques, such as direct glass laser bonding.

At step 506, a new diffractive grating 516 may be fabricated onto the second surface 514. For example, a standard surface relief grating may be fabricated onto the surface of second surface 514, such as through laser etching/ablation. In some embodiments, the surface relief grating comprises a high index material that is patterned onto the second surface using any of the techniques previously described herein. In some embodiments, the high index material comprises a transparent conductive material. The design of the new diffractive grating 516 may be a same design as the design of the grating 512 and/or a different design.

While FIG. 5 depicts the fabrication of multiple types of diffraction gratings (e.g., a buried diffractive grating and a surface relief grating) in an optical element, in some embodiments, only one type of diffraction grating (e.g., the buried diffractive grating or the surface relief grating) may be fabricated in the optical element. In some embodiments, diffractive grating 516 may be patterned on multiple sides of substrate 510.

Figure 6:
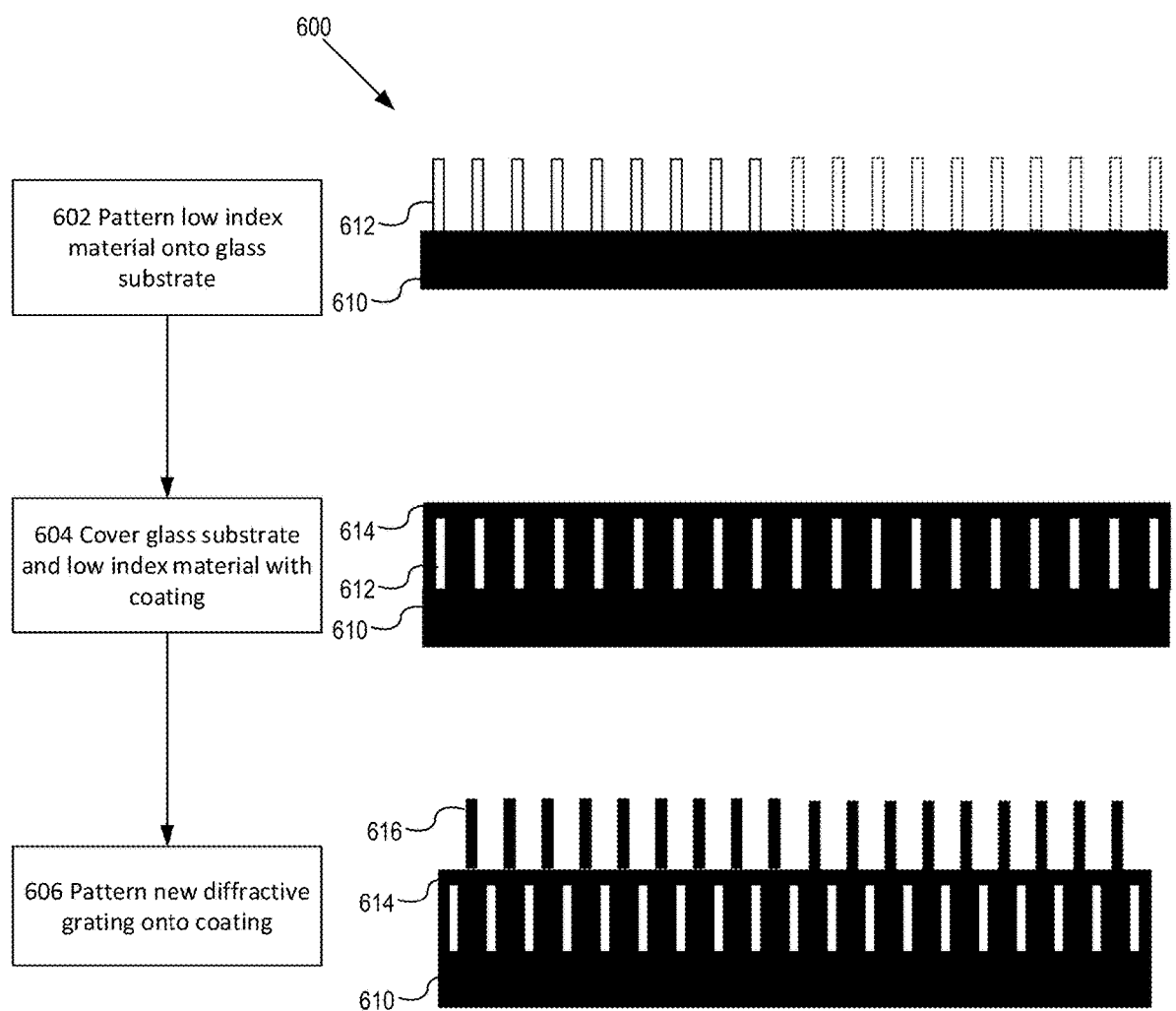
FIG. 6 depicts an example of fabricating diffractive gratings in an optical element using a low-refractive index material.

FIG. 6 depicts an example of fabricating diffractive gratings in an optical element using a low-refractive index material. Optical element 600 includes substrate 610. Substrate 610 may comprise a material with a high refractive index for fabricating a buried diffractive grating onto, such as glass or plastic. At step 602, a low-refractive index material 612 is patterned onto the substrate. Low-index material 612 may comprise a material with a refractive index that is substantially lower than the refractive index of substrate 610, such as lithium fluoride, calcium fluoride, magnesium fluoride, or any other low refractive index optical resin. Substantially lower, as used herein, refers to a difference of 0.5 or greater between the two indices.

The low index material 612 may be patterned onto substrate 610 in any of a plurality of designs, including blazed patterns, slanted patterns, binary patterns, analogue structures, or varying-depth structures. Techniques for patterning low-index material 612 onto substrate 610 include any of electron beam lithography, interference lithography, nanoimprint lithography, hot embossing, photolithography with a pattern transfer, reactive ion etching and deposition of the low index material, or any other lithography or patterning techniques.

At step 604, a high index coating 614 is applied to cover low index material 612 and substrate 610. High index coating 614 may comprise any of cubic zirconium oxide, titanium oxide, aluminum oxide, diamond, hafnium oxide, tantalum oxide, zinc oxide, or any other high-index resins. In some embodiments, high index coating 614 is selected to have a refractive index that is substantially equal to the refractive index of substrate 610. Processes for coating the high-index coating onto the low index material 612 and substrate 610 include any of physical vapor deposition, atomic layer deposition, chemical vapor deposition, application of nanoparticle inks, spin coating, or dip-coating.

At step 606, a new diffractive grating 616 may be patterned onto the high index coating 614. The new diffractive grating 616 may be patterned onto high index coating 614 in any of a plurality of designs, including blazed patterns, slanted patterns, binary patterns, or analogue structures. The design of the new diffractive grating 616 may be a same design as the design of the low index material 612 and/or a different design. Techniques for patterning new diffractive grating 616 onto high index coating 614 include any of electron beam lithography, interference lithography, nanoimprint lithography, hot embossing, photolithography, focused ion beams, or any other lithography or patterning techniques. In some embodiments, the new diffractive grating 616 is fabricated using a transparent conductive material.

While FIG. 6 depicts the fabrication of multiple types of diffraction gratings (e.g., a buried diffractive grating and a surface relief grating) in an optical element, in some embodiments, only one type of diffraction grating (e.g., the buried diffractive grating or the surface relief grating) may be fabricated in the optical element. In some embodiments, diffractive grating 616 may be patterned on multiple sides of substrate 610.

The fabrication techniques described herein with respect to FIGS. 4-6 provide a wide array of benefits. One such benefit is that buried diffractive gratings can be fabricated in different structures within the optical element, such as blazed structures, slanted structures, binary structures, analogue structures, or varying-depth structures. In particular, varying-depth structures are not possible with surface relief gratings. In contrast, buried diffractive gratings can be fabricated at different depths depending on need, with some embodiments including buried diffractive gratings in a center of the optical element and other embodiments including buried diffractive gratings closer to one surface of the optical element than the other. In addition, a single diffractive grating can be fabricated with portions of the buried diffractive grating at different depths. In some embodiments, different buried diffractive gratings in a single optical element can be fabricated at different depths, such as an in-coupling grating at a first depth and an out-coupling grating at a second depth. Such techniques enable different types of structures to be used in combination to produce different effects, e.g., improved diffraction efficiency and image quality.

FIG. 7 depicts an example of fabricating diffractive gratings at multiple depths in an optical element. Optical element 700 includes substrate 710 at a plurality of varying heights. Substrate 710 may comprise a material with a high refractive index for fabricating the buried diffractive grating onto, such as glass or plastic. Substrate 710 may be fabricated to have varying heights through bonding of multiple pieces of substrate, such as laser bonding of glass, and/or through removal of a portion of the substrate, such as by laser etching or other glass cutting processes. The varying heights may be fabricated in a location designated for a single buried diffractive grating and/or in locations for different buried diffractive gratings such that a first location is a first height and a second location is a second height.

At step 702, sacrificial material 712 is patterned onto the substrate at the plurality of varying heights. Sacrificial material 712 may comprise a soluble or dissolvable material, such as a photoresist, a water-soluble polymer or material, or an organic-solvent soluble polymer or material. One example of sacrificial material includes water soluble polyvinyl alcohol.

The sacrificial material 712 may be patterned onto substrate 710 in any of a plurality of designs, including blazed patterns, slanted patterns, binary patterns, analogue structures, or varying-depth structures. Techniques for patterning sacrificial material 712 onto substrate 710 include any of electron beam lithography, interference lithography, nanoimprint lithography, hot embossing, photolithography, focused ion beams, or any other lithography or patterning techniques.

At step 704, a high index coating 714 is applied to cover sacrificial material 512 and substrate 510. High index coating 714 may comprise any of cubic zirconium oxide, titanium oxide, aluminum oxide, diamond, hafnium oxide, tantalum oxide, zinc oxide, or any other high-index resins. In some embodiments, high index coating 714 is selected to have a refractive index that is substantially equal to the refractive index of substrate 710. Processes for coating the high-index coating onto the sacrificial material 712 and substrate 7510 include any of physical vapor deposition, atomic layer deposition, chemical vapor deposition, application of nanoparticle inks, spin casting, or dip-coating.

At step 706, after the high index coating has been applied to cover sacrificial material 712 and substrate 710, the sacrificial material is removed. For example, a sintering or dissolution process may be applied to optical element 700 to remove sacrificial material.

At step 708, a new diffractive grating 716 may be patterned onto the high index coating 714. The new diffractive grating 716 may be patterned onto high index coating 514 in any of a plurality of designs, including blazed patterns, slanted patterns, binary patterns, or analogue structures. The design of the new diffractive grating 716 may be a same design as the design of the sacrificial material 712 and/or a different design. Techniques for patterning new diffractive grating 716 onto high index coating 714 include any of electron beam lithography, interference lithography, nanoimprint lithography, hot embossing, photolithography, focused ion beams, or any other lithography or patterning techniques. In some embodiments, the new diffractive grating 716 is fabricated using a transparent conductive material.

While FIG. 7 depicts the fabrication of multiple types of diffraction gratings (e.g., a buried diffractive grating and a surface relief grating) in an optical element, in some embodiments, only one type of diffraction grating (e.g., the buried diffractive grating or the surface relief grating) may be fabricated in the optical element. In some embodiments, diffractive grating 716 may be patterned on multiple sides of substrate 710.

While FIG. 7 depicts a method of fabricating diffractive gratings with varying-depth diffractive gratings, other embodiments of fabricating a slanted buried diffractive grating with varying-depth diffractive gratings may include laser bonding of glass at different widths, using methods described in respect to FIG. 5, or coating a low-index material with a high-index material, using methods described in respect to FIG. 6. Additionally, while FIG. 7 depicts a diffractive grating with buried diffractive gratings at different depths, in some embodiments, only a strict subset of the different depths is used to create the diffractive grating. Thus, the diffractive grating may include a buried diffractive grating that is situated at a different depth than another slanted buried diffractive grating.

Figure 8A:
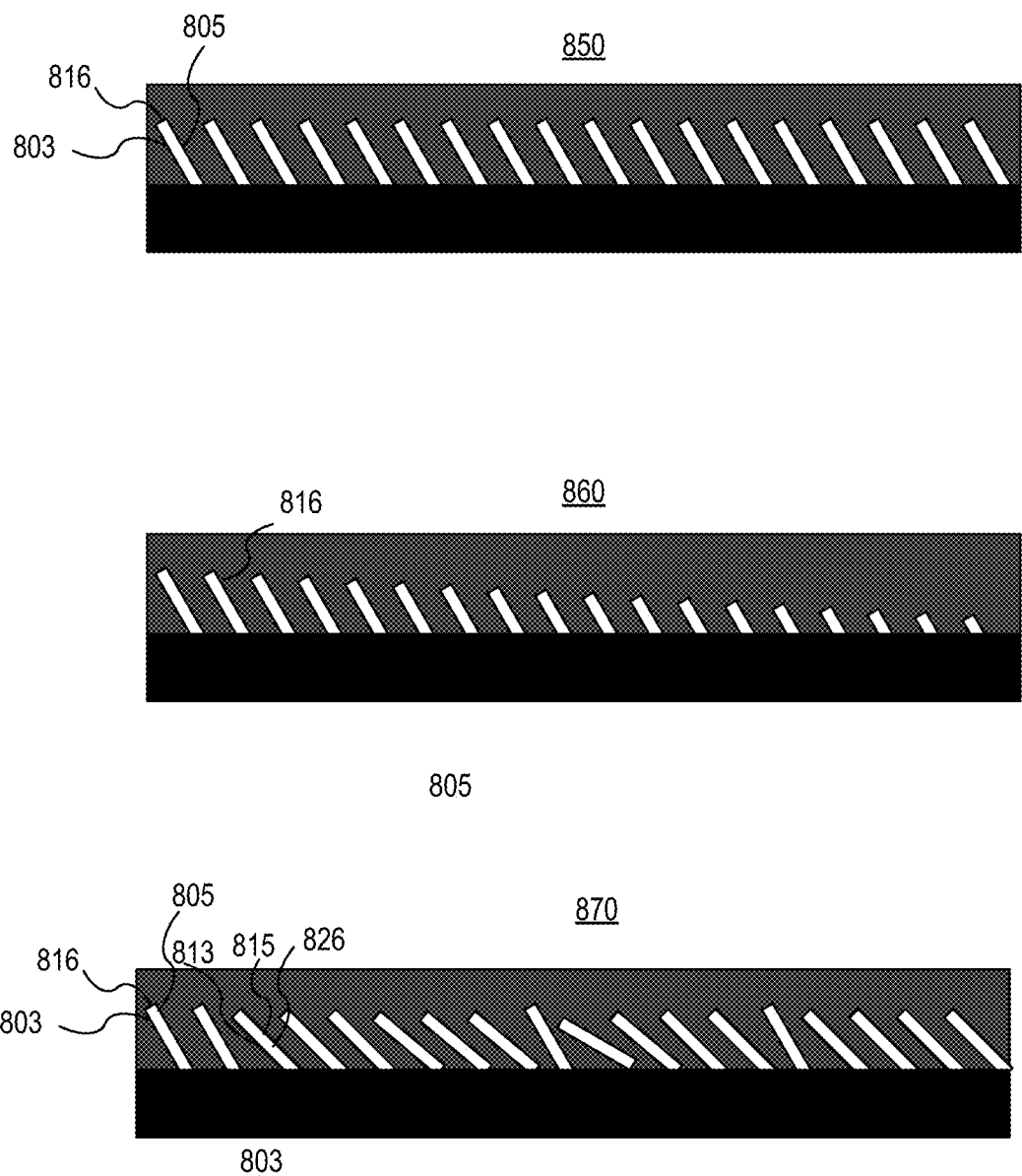

Another benefit of the fabrication techniques described herein is that the resultant buried diffractive grating may be separated from the surface of the optical element, thereby protecting the buried diffractive grating and allowing additional coatings or layers to be added to the optical element. FIGS. 8A-8B depict example structures of slanted buried diffractive gratings. In some embodiments, the structures depicted in FIGS. 8A-8B may be formed as a result of performing the process described and shown in FIGS. 2A-2C. Structure 850 comprises uniformly slanted buried diffractive gratings. For example, first surface 803 and second surface 805 of diffractive grating 816 may be may be configured to be at a particular non-zero angle with respect to surfaces of opposing surfaces of the optical element having structure 850, and each of the surfaces of the diffractive gratings of structure 850 may be oriented at the same particular angle relative to the opposing surfaces of the optical element having structure 850. Structure 860 comprises varying-depth slanted buried diffractive gratings. Structure 870 comprises a slanted buried diffractive gratings at varying angles. For example, in structure 870, surfaces 803 and 805 of diffractive grating 816 may be configured to be at a first non-zero angle with respect to surfaces of opposing surfaces of the optical element having structure 870, and surfaces 813 and 815 of diffractive grating 826 may be configured to be at a second non-zero angle (different from the first non-zero angle) with respect to surfaces of opposing surfaces of the optical element having structure 870. As shown in FIG. 8B, structure 880 comprises a slanted buried diffractive gratings at varying angles. For example, in structure 880, diffractive grating 816 may be configured to be at a first non-zero angle while diffractive grating 830 may be configured to be at a zero angle. Similar to structure 880, structure 890 may comprise diffractive gratings 816 of varying angles and varying sizes (e.g., diffractive grating 831). In some embodiments, a structure may comprise any suitable combination of varying depths of buried diffractive gratings and/or varying angles of buried diffractive gratings and/or including varying of any other suitable grating characteristic. As shown in the examples of FIGS. 8A-8B, the methods described herein may be used to generate grating structures with any suitable combination of a variety of buried depth structures.

Figure 9A:
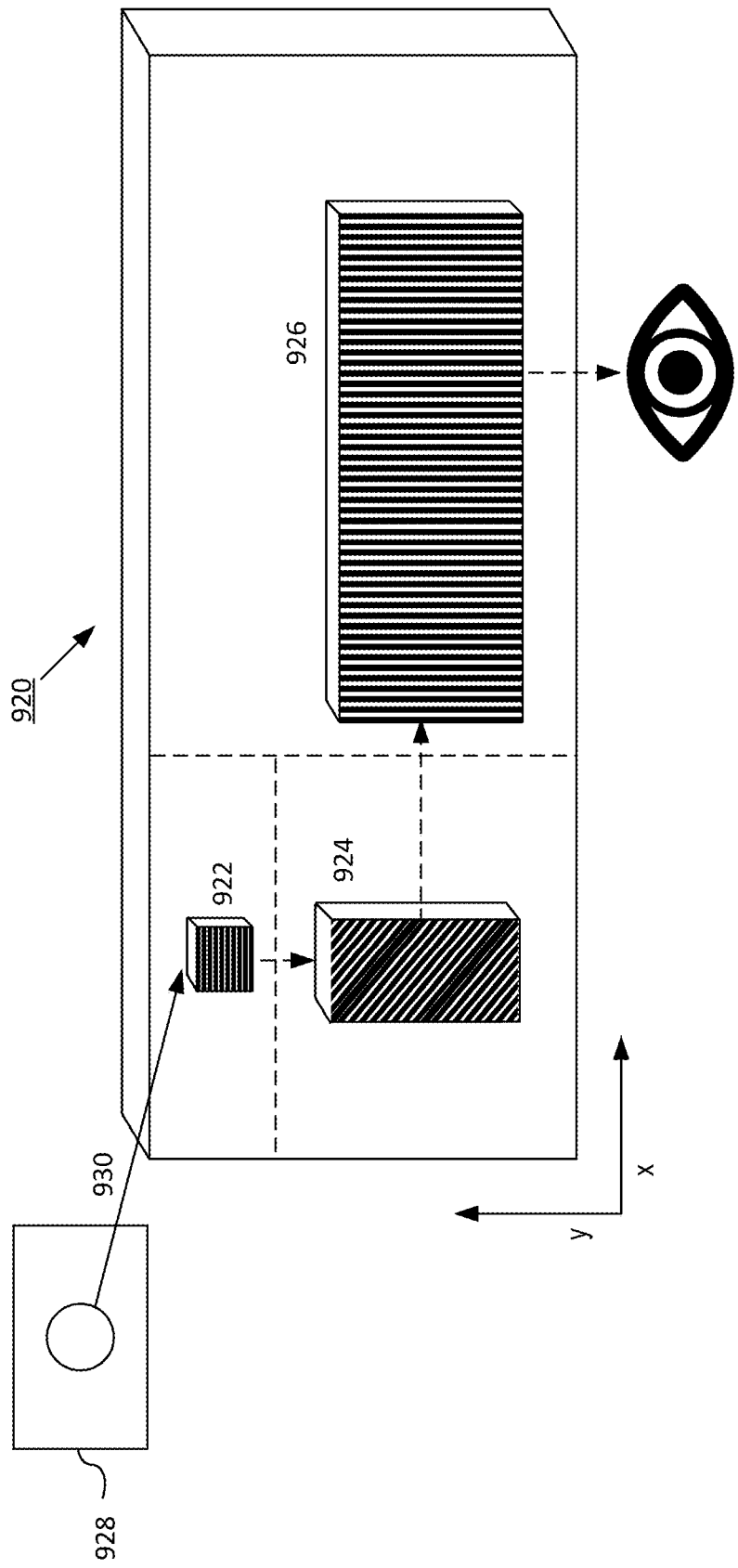
FIG. 9A depicts a diagram of a plurality of diffraction gratings of an optical element of an HMD or other suitable optical equipment.

FIG. 9A depicts a diagram of a plurality of diffraction gratings of an optical element of an HMD, or other suitable optical equipment. Optical element 920 comprises in-coupling grating 922, expansion grating 924, and out-coupling grating 926. In some embodiments, optical element 920 may correspond to, and may be formed in the same manner as, optical element 208 of FIG. 2 Any of in-coupling grating 922, expansion grating 924, and out-coupling grating 926 may comprise slanted buried diffractive gratings as described herein. While FIG. 9A depicts three diffractive gratings, other embodiments may include more or less diffractive gratings. For example, an optical element may include a plurality of expansion gratings including a first expansion grating that expands the image beam in a first direction and a second expansion grating that expands the image beam in a second direction perpendicular to the first direction.

Image source 928 transmits image beam 930 into optical element 920 at in-coupling grating 922. In-coupling grating 922 diffracts the image beam along optical element 920 through total internal reflection towards expansion grating 924. Expansion grating 924 comprises a grating configured to expand an incoming beam in the plane of the waveguide. Expansion grating 924 may also be configured to redirect the image beam to another direction. For example, in FIG. 9A, expansion grating 924 redirects the incoming beam from the x-direction to the y-direction towards out-coupling grating 926. Out-coupling grating 926 is configured to diffract the expanded beam towards an eyeball of a wearer of an HMD, such as HMD 1200 of FIG. 12. In some embodiments out-coupling grating 926 is further configured to expand the image beam, such as in a direction perpendicular to the direction expanded by the expansion grating. Thus, if expansion grating 924 expands the image beam in the x-direction, out-coupling grating 926 may be configured to expand the image beam in the y-direction, wherein the z-direction is perpendicular to the optical element in a direction of the user's eye.

Figure 9B:
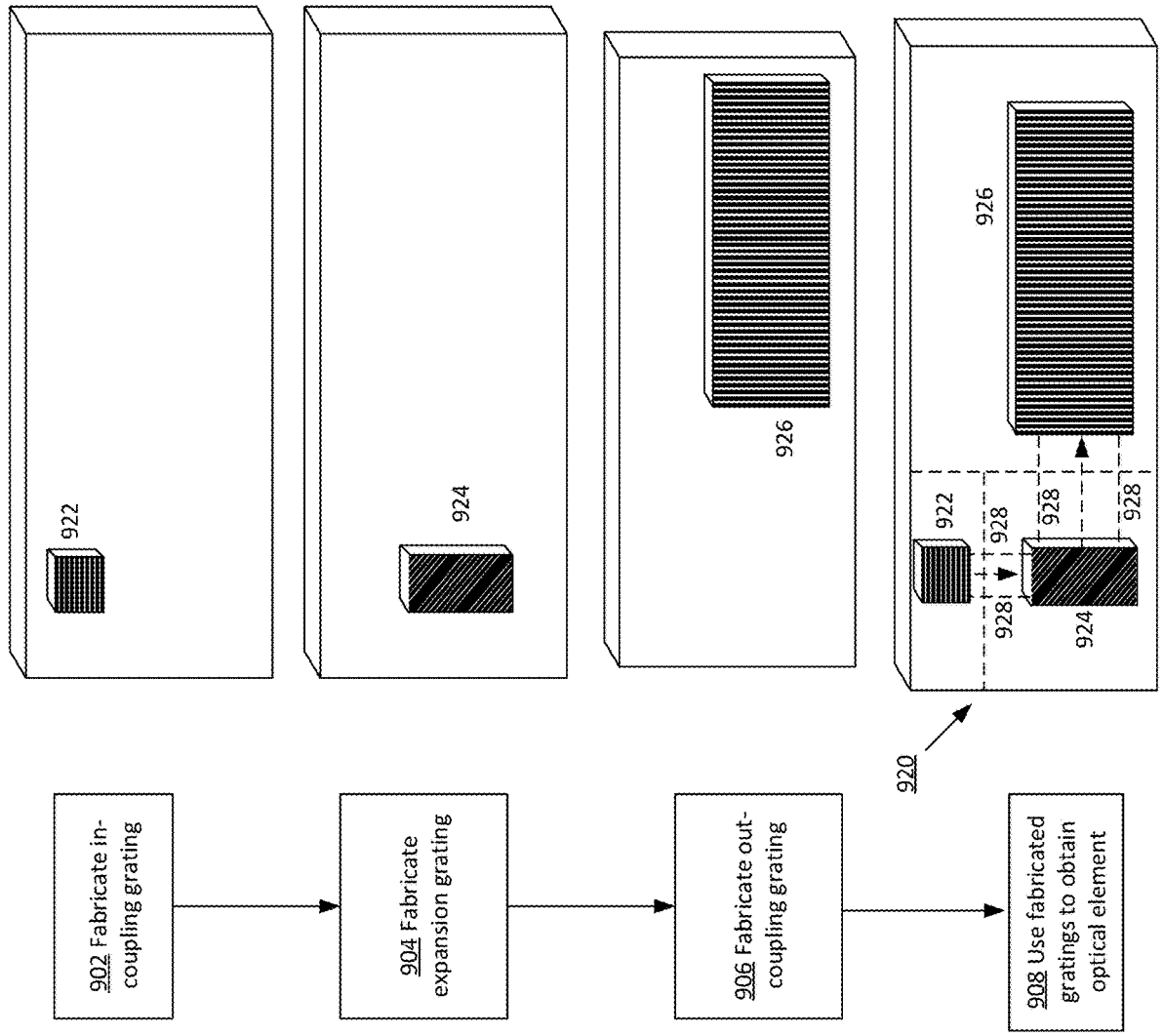
FIG. 9B depicts an example of fabricating a plurality of diffraction gratings of an optical element of an HMD or other suitable optical equipment.

FIG. 9B depicts an example of fabricating a plurality of diffraction gratings of an optical element of an HMD or other suitable optical equipment. At 902, in-coupling grating 922 may be fabricated, e.g., using any of the suitable techniques discussed in connection with FIGS. 2-7. At 904, expansion grating 924 may be fabricated, e.g., using any of the suitable techniques discussed in connection with FIGS. 2-7. At 906, out-coupling grating 926 may be fabricated, e.g., using any of the suitable techniques discussed in connection with FIGS. 2-7. In some embodiments, each of in-coupling grating 922, expansion grating 924 and out-coupling grating 926 may have the same number of diffractive gratings, the same types of diffractive gratings, different numbers of diffractive gratings, different types of diffractive gratings, or any suitable combination thereof.

At 908, in-coupling grating 922, expansion grating 924 and out-coupling grating 926, having been fabricated at 902, 904 and 906, respectively, may be used to obtain optical element 920. In some embodiments, in-coupling grating 922, expansion grating 924 and out-coupling grating 926 may be bonded 928 together in optical element 920 using glue, adhesive and/or using any other suitable technique.

Figure 10A:
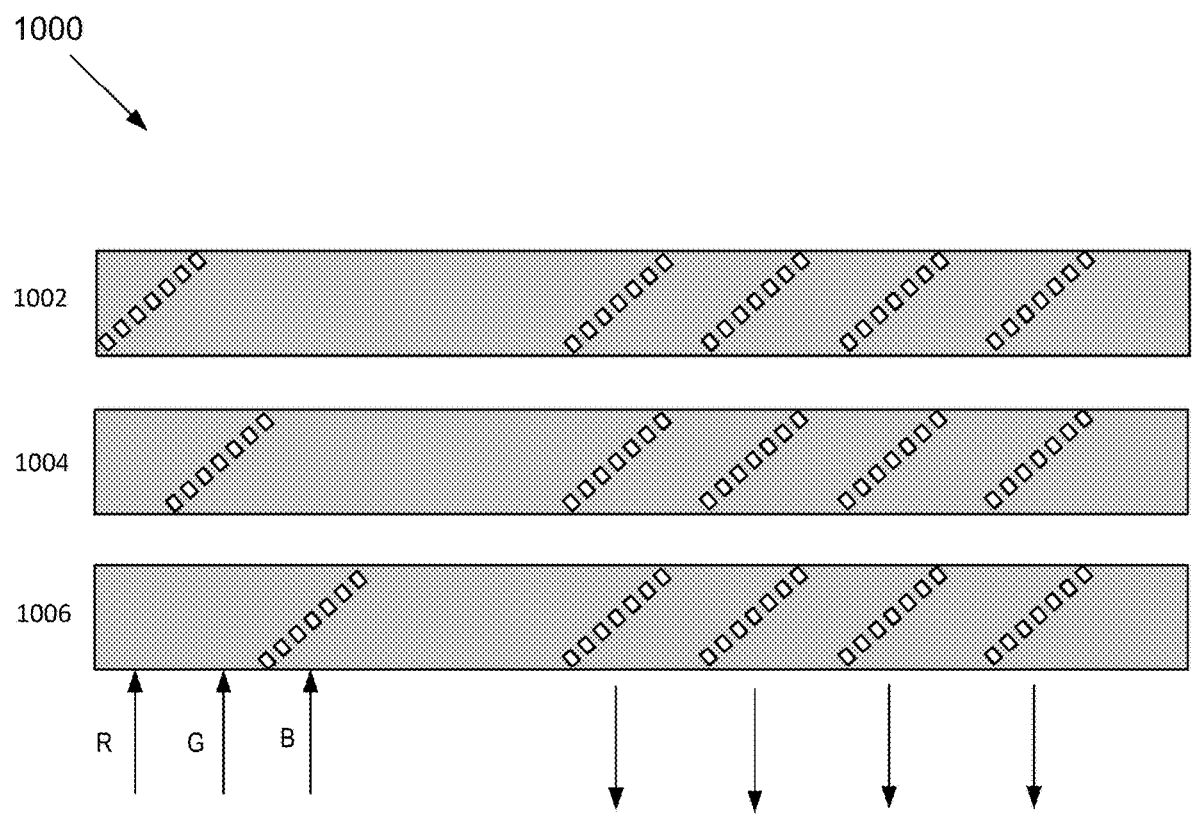

FIGS. 10A-10B depict examples of a plurality of waveguides for use in an HMD or other suitable optical equipment. While FIGS. 10A-10B depict three stacked optical elements for the purpose of providing a clear example, other embodiments may include fewer or more stacked optical elements. Additionally, while FIGS. 10A-10B depict optical elements for different wavelengths, the combination of optical elements described herein may be used with other types of optical elements, such as optical elements for different focal points. The combination of waveguides described with respect to FIGS. 10A-10B may additionally be combined with other embodiments, including additional lenses, such as the ophthalmic lenses of FIG. 11, or other types of coatings, such as anti-reflective coatings.

Optical element combination 1000 comprises three optical elements 1002, 1004, and 1006. In some embodiments, optical elements 1002, 1004, and 1006 may be separated from each other using an air spacing, or using an angular-sensitive layer coating 1020. Each of optical elements 1002, 1004, and 1006 may comprise slanted buried diffractive gratings. While the slanted buried diffractive gratings in FIGS. 10A-10B are depicted as being equivalent, other embodiments may include buried diffractive gratings with different structures, of different sizes, at different angles, at different positions, at different depths, and/or with different spacings, or any other suitable characteristic may be varied across one or more gratings. Each of optical elements 1002, 1004, and 1006 may be configured to diffract image beams of different wavelengths. For example, optical element 1002 may comprise a waveguide configured to diffract an image beam with a wavelength of 465 nm; optical element 1004 may comprise a waveguide configured to diffract an image beam with a wavelength of 530 nm; and optical element 1006 may comprise, or otherwise correspond to, a waveguide configured to diffract an image beam with a wavelength of 630 nm. Thus, an HMD or other suitable optical equipment may provide each image beam to a different waveguide, thereby providing a full color image to an eye of a viewer.

Figure 11:
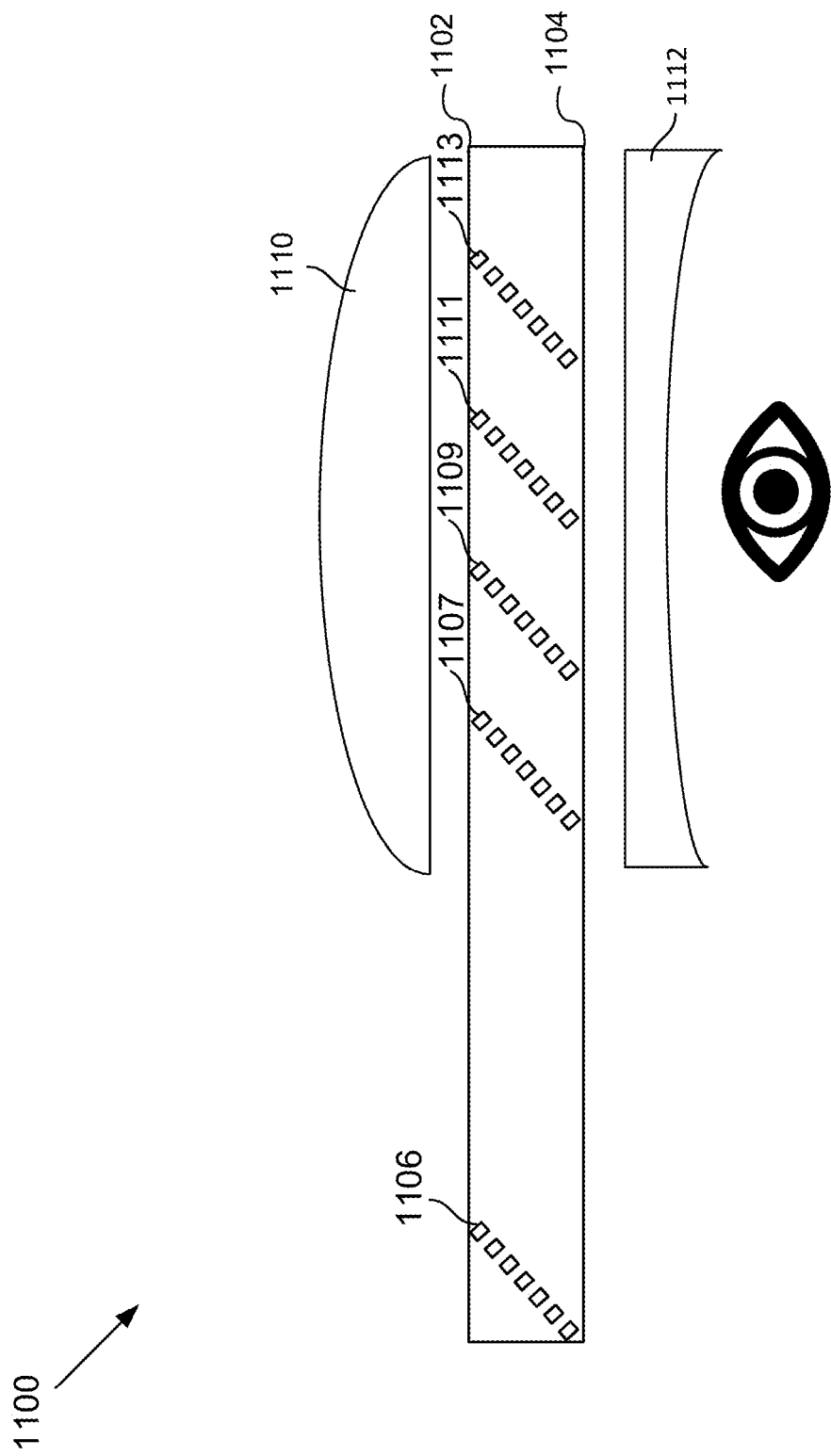
FIG. 11 depicts an optical element comprising one or more slanted buried diffractive gratings and other optical elements attached thereto.

FIG. 11 depicts an optical element comprising one or more slanted buried diffractive gratings and other optical elements attached thereto. Optical element 1100 comprises slanted buried diffractive grating 1106, 1107, 1109, 1111 and 1113, surface 1102, and surface 1104. Surface 1102 and surface 1104 may comprise substantially flat surfaces that are substantially parallel to each other. Surface 1102 and surface 1104 may comprise a same material, such as glass or plastic, or different materials, such as glass with a high-refractive index coating that has a refractive index substantially equal to that of the glass. In some embodiments, each of surface 1102 and surface 1104 may be coated with an angular-sensitive coating to provide respective layers acting as a pseudo-air layers, which may enable the waveguide to continue to operate as if surface 904 and surface 906 were surrounded with a substance with a low refractive index, such as air or gas.

Convex lens 1110 and concave lens 1112 comprise two examples of ophthalmic lenses that may be used in conjunction with optical element 1100. In some embodiments, convex lens 1110 and concave lens 1112 may be separated from surfaces 1102 and 1104, respectively, using air spacings. In some embodiments, convex lens 1110 and concave lens 1112 may be attached to the flat surface of optical element 1100 on the pseudo-air layers made up of the angular-sensitive coating. Convex lens 1110 comprises a lens with a rounded surface and a flat surface that may be separated from surface 1102 by an air spacing or a pseudo-air layer. Similarly, concave lens 1112 comprises a lens with a rounded surface and a flat surface that is separated from surface 1104 by an air spacing or a pseudo-air layer. Other embodiments may include a single optical element attached to optical element 1100 and separated by an air spacing or a pseudo-air layer. Additionally, embodiments may include different types of optical elements attached to optical element 1100 and separated by an air spacing or a pseudo-air layer, such as photochromic or electrochromic lenses, actively operated lenses, polarized lenses, or other lenses.

In some embodiments, an air spacing or an angular-sensitive coating is used to separate waveguides comprising one or more slanted buried diffractive gratings. The use of the buried diffractive gratings in the slanted buried diffractive gratings enables the waveguides to be stacked on top of each other, thereby creating a compact set of waveguides which can be used to provide a plurality of images, such as images at different focal points or images at different frequencies.

In some embodiments, an additional coating may be used to coat surface 1102 or 1104 after fabrication of the buried diffractive grating and/or is coated on top of an angular-sensitive reflective coating that is coated on top of the surface. Such additional coating may comprise a wax or polish; an anti-reflective coating, such as magnesium fluoride; a high-reflection coating, such as a combination of zinc sulfide or titanium dioxide with magnesium fluoride or silicon dioxide; a transparent conductive coating, such as indium tin oxide; or any other coating material. In some embodiments, the coating is used to provide a pseudo-air layer between different types of lenses. In some embodiments, a coating is used to provide an optical isolation of the waveguide and other appended optical elements, such as lenses. The coating may comprise an angular-sensitive reflective coating that maintains operation of the waveguide at the angles at which light is expected to strike the surface based on the diffractive gratings. The angular-sensitive layer effectively isolates the waveguide operation at the relevant angles, allowing other optical elements to be attached to the surface over the coating. Examples of additional optical elements include ophthalmic lenses, photochromic or electrochromic lenses, dynamic or active operated lenses, polarized lenses, or other lenses. In some embodiments, the angular-sensitive reflective coating is used in conjunction with the additional coatings described above, such that the pseudo-air layer is placed between the optical element and the additional coating.

Figure 12:
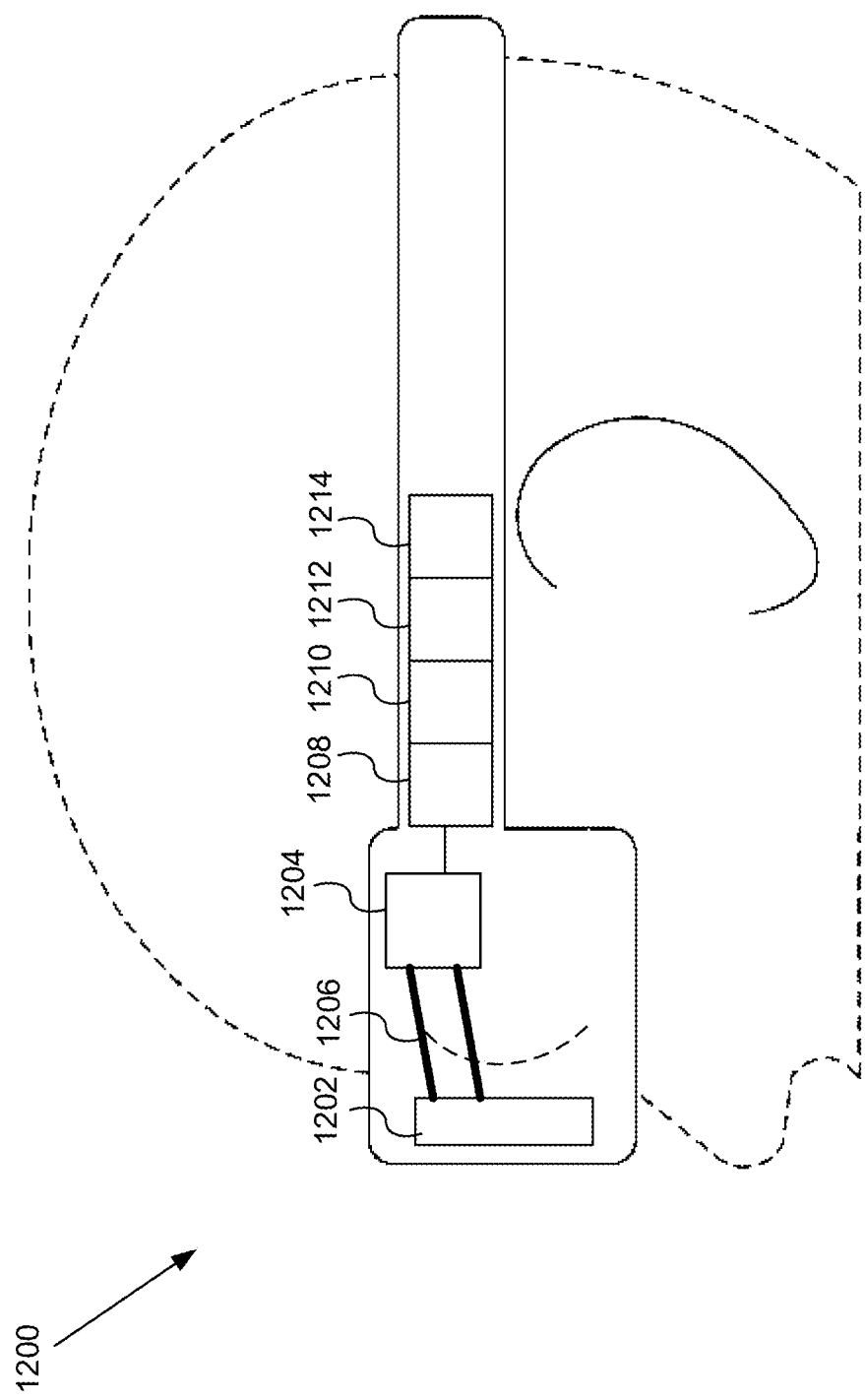
FIG. 12 depicts an example of an HMD, or other suitable optical equipment, comprising one or more optical elements with a slanted buried diffractive grating.

FIG. 12 depicts an example of an HMD comprising one or more optical elements with a buried diffractive grating. In some embodiments, an HMD may correspond to optical equipment. HMD 1200 comprises optical element 1202, image source 1204, control circuitry 1208, memory 1210, network adaptor 1212, and power source 1214. Optical element 1202 comprises an optical element, such as a lens, which sits in front of an eye of a user. Image source 1204 provides an image beam 1206 to the optical element, which is diffracted by a buried diffractive grating and displayed to the eye of the user. Control circuitry 1208 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., quad-core). Control circuitry 1208 may be configured to generate one or more images for display through the HMD and instruct image source 1204 to produce one or more image beams corresponding to the one or more images. Memory 1210 may be any device for storing electronic data, such as a random-access memory, a solid-state device, a quantum storage device, a hard disk drive, a non-volatile memory or any other suitable fixed or removable storage device, and/or any combination of the same. Memory 1210 may store data defining images for display by the HMD. Network adaptor 1212 comprises circuitry that connects the HMD to one or more other devices over a network. Network adaptor 1212 may comprise wires and/or busses connected to a physical network port, e.g. an ethernet port, a wireless Wi-Fi port, a cellular communication port, or any other type of suitable physical port. Power source 1214 comprises a source of power to the image source 1204, control circuitry 1208, memory 1210, and/or network adaptor 1212, such as a battery, solar generator, or wired power source.

What is claimed is:

1. A display comprising:
an image source configured to provide an image beam; and
an optical element comprising a first flat surface, a second flat surface opposing the first surface, and a first buried diffractive grating disposed between the first flat surface and the second flat surface, the first buried diffractive grating being positioned in a slanted arrangement at a first angle relative to the first flat surface and the second flat surface;
wherein the optical element is configured to convert the image beam into an output image by diffracting the image beam through the first buried diffractive grating, propagating the image beam through the optical element through reflection off the first and second flat surfaces, and directing the image beam through at least one of the first or second flat surfaces of the optical element;
wherein the optical element further comprises a second buried diffractive grating having the slanted arrangement at a second angle relative to the first flat surface and the second flat surface; and
wherein the first buried diffractive grating is configured to be of a different size than the second buried diffractive grating, based on a location of the second buried diffractive grating within the optical element.

2. The display of claim 1, wherein the first buried diffractive grating comprises a first surface opposing a second surface, and the first buried diffractive grating being positioned in the slanted arrangement at the first angle relative to the first flat surface and the second flat surface of the optical element comprises the first surface and the second surface of the first buried diffractive grating being positioned in the slanted arrangement at the first angle relative to the first flat surface and the second flat surface.

3. The display of claim 1, wherein the optical element further comprises a third buried diffractive grating having a non-slanted arrangement.

4. The display of claim 1, wherein the first buried diffractive grating is positioned at a first depth within the optical element and the second buried diffractive grating is positioned at a second depth, different from the first depth, within the optical element.

5. The display of claim 1, wherein the first buried diffractive grating comprises a refractive index that is different from a refractive index of the second diffractive grating.

6. The display of claim 1, wherein the first angle of the slanted arrangement of the first buried diffractive grating is different from the second angle of the slanted arrangement of the second buried diffractive grating.

7. The display of claim 1, wherein the first buried diffractive grating is spaced closer to the first surface than the second buried diffractive grating.

8. The display of claim 1, wherein the first buried diffractive grating is an in-coupling buried diffractive grating and the second buried diffractive grating is an out-coupling buried diffractive grating.

9. The display of claim 1, wherein the optical element is a first optical element, and the display further comprises:
a second optical element;
wherein a flat surface of the first optical element is separated from a flat surface of the second optical element by an angular-sensitive reflective coating;
wherein the image source is configured to provide a first image beam at a first wavelength to the first optical element and a second image beam at a second wavelength to the second optical element.

10. The display of claim 1, wherein the optical element is a first optical element, and the display further comprises:
a second optical element comprising a third surface, a fourth surface opposing the third surface, and a third buried diffractive grating disposed between the third surface and the fourth surface;
wherein the fourth surface of the second optical element is separated from the first surface of the first optical element by an angular-sensitive reflective coating;
wherein the image source is configured to provide a first image beam at a first wavelength to the first optical element and a second image beam at a second wavelength to the second optical element.

11. The display of claim 1, wherein the optical element is a first optical element, and the display further comprises:
a second optical element comprising a third surface, a fourth surface opposing the third surface, and a third buried diffractive grating disposed between the third surface and the fourth surface;
wherein the fourth surface of the second optical element is separated from the first surface of the first optical element by an angular-sensitive reflective coating;
wherein the first optical element is configured to output the image at a first focus and the second optical element is configured to output the image at a second focus.

12. The display of claim 1, wherein the first buried diffractive grating comprises an expansion buried diffractive grating, and the optical element is configured to convert the image beam into an image by:
receiving the image beam at an in-coupling buried diffractive grating which diffracts the image beam towards the expansion buried diffractive grating;
expanding the image beam by the expansion buried diffractive grating of the optical element and transmitting the image beam from the first expansion buried diffractive grating to an out-coupling buried diffractive grating; and
diffracting the expanded image beam by the out-coupling buried diffractive grating towards an eyeball of a wearer of the display.

13. The display of claim 1, wherein the first angle is equal to the second angle.

14. A method for producing a waveguide for a display comprising:
fabricating an optical element with a first buried diffractive grating positioned in a slanted arrangement at a first angle relative to a first flat surface and a second flat surface of the optical element, wherein the first buried diffractive grating is disposed between the first flat surface and the second flat surface, and the first flat surface opposes the second flat surface;
wherein the optical element further comprises a second buried diffractive grating having the slanted arrangement at a second angle relative to the first flat surface and the second flat surface; and
wherein the first buried diffractive grating is configured to be of a different size than the second buried diffractive grating, based on a location of the second buried diffractive grating within the optical element.

15. The method of claim 14, wherein the first buried diffractive grating comprises a first surface opposing a second surface, and the first buried diffractive grating being positioned in the slanted arrangement at the first angle relative to the first flat surface and the second flat surface of the optical element comprises the first surface and the second surface of the first buried diffractive grating being positioned in the slanted arrangement at the first angle relative to the first flat surface and the second flat surface.

16. The method of claim 14, wherein fabricating the optical element comprises:
bonding together a plurality of layers to obtain a stack of the layers, wherein at least one of the layers comprises one or more diffractive gratings; and
slicing the stack of the plurality of layers at a desired angle to obtain the optical element comprising the first buried diffractive grating having the slanted arrangement.

17. The method of claim 14, wherein the first angle is equal to the second angle.

18. A waveguide produced by fabricating an optical element with a first buried diffractive grating positioned in a slanted arrangement at a first angle relative to a first flat surface and a second flat surface of the optical element, wherein the first buried diffractive grating is disposed between the first flat surface and the second flat surface, and the first flat surface opposes the second flat surface;
wherein the optical element further comprises a second buried diffractive grating having the slanted arrangement at a second angle relative to the first flat surface and the second flat surface; and
wherein the first buried diffractive grating is configured to be of a different size than the second buried diffractive grating, based on a location of the second buried diffractive grating within the optical element.

19. The waveguide of claim 18, wherein the first buried diffractive grating comprises a first surface opposing a second surface, and the first buried diffractive grating being positioned in the slanted arrangement at the first angle relative to the first flat surface and the second flat surface of the optical element comprises the first surface and the second surface of the first buried diffractive grating being positioned in the slanted arrangement at the first angle relative to the first flat surface and the second flat surface.

20. The waveguide of claim 18, wherein fabricating the optical element comprises:
bonding together a plurality of layers to obtain a stack of the layers, wherein at least one of the layers comprises one or more diffractive gratings; and
slicing the stack of the plurality of layers at a desired angle to obtain the optical element comprising the first buried diffractive grating having the slanted arrangement.

\* \* \* \* \*